United States Patent
Beals

(10) Patent No.: US 10,097,903 B2
(45) Date of Patent: Oct. 9, 2018

(54) ENHANCED RELIABILITY FOR SATELLITE DATA DELIVERY

(71) Applicant: DISH Technologies L.L.C., Englewood, CO (US)

(72) Inventor: William Michael Beals, Englewood, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

(21) Appl. No.: 15/208,842

(22) Filed: Jul. 13, 2016

(65) Prior Publication Data

US 2016/0323652 A1    Nov. 3, 2016

Related U.S. Application Data

(63) Continuation of application No. 14/923,576, filed on Oct. 27, 2015, now Pat. No. 9,420,346, which is a
(Continued)

(51) Int. Cl.
*H04N 7/20*      (2006.01)
*H04N 21/61*      (2011.01)
(Continued)

(52) U.S. Cl.
CPC ..... *H04N 21/6143* (2013.01); *H04B 7/18517* (2013.01); *H04N 21/4263* (2013.01);
(Continued)

(58) Field of Classification Search
CPC ............... H04N 21/23116; H04N 21/6375
See application file for complete search history.

(56) References Cited

U.S. PATENT DOCUMENTS 6,104,911 A * 8/2000 Diekelman ........ H04B 7/18534
                                                             342/352
6,269,242 B1 * 7/2001 Leopold ............... H04B 7/2041
                                                              455/12.1
(Continued)

FOREIGN PATENT DOCUMENTS

| WO | 9959263 A1 | 11/1999 |
| WO | 2009/035466 A1 | 3/2009 |
| WO | 2014/106005 A1 | 7/2014 |

OTHER PUBLICATIONS

Office action for European Patent Application No. 13869706.5 dated Mar. 30, 2016, 5 pages.
(Continued)

*Primary Examiner* — Junior O Mendoza
(74) *Attorney, Agent, or Firm* — Kilpatrick Townsend & Stockton LLP

(57) ABSTRACT

A media device may be configured for receiving data from one or more satellites. The media device may include one or more processors and one or more storage devices. A first tuner of a media device may tune to a first data stream that came from a first satellite transponder. A second tuner of the media device may tune to a second data stream that came from a second satellite transponder. The first data stream and the second data stream may be derived from source data based at least in part on a data distribution scheme. The data distribution scheme may include distributing at least portions of the source data with the first data stream and the second data stream. The first data stream and/or the second data stream may be processed to store and/or output for presentation content.

18 Claims, 10 Drawing Sheets

Related U.S. Application Data continuation of application No. 13/776,726, filed on Feb. 26, 2013, now Pat. No. 9,204,201.

(60) Provisional application No. 61/746,531, filed on Dec. 27, 2012.

(51) Int. Cl.
| | |
|---|---|
| *H04B 7/185* | (2006.01) |
| *H04N 21/4425* | (2011.01) |
| *H04N 21/426* | (2011.01) |
| *H04N 21/63* | (2011.01) |

(52) U.S. Cl.
CPC ..... *H04N 21/4425* (2013.01); *H04N 21/6193* (2013.01); *H04N 21/631* (2013.01)

(56) References Cited

U.S. PATENT DOCUMENTS

| | | | | |
|---|---|---|---|---|
| 7,532,860 | B2* | 5/2009 | Loner | H04B 7/18513 |
| | | | | 342/352 |
| 9,204,201 | B2* | 12/2015 | Beals | H04N 21/6193 |
| 9,420,346 | B2* | 8/2016 | Beals | H04N 21/6193 |
| 2002/0164948 | A1* | 11/2002 | Parkman | H04B 7/18508 |
| | | | | 455/13.1 |
| 2003/0031265 | A1* | 2/2003 | Friedman | H04B 7/18515 |
| | | | | 375/260 |
| 2003/0095064 | A1* | 5/2003 | Branscombe | H04B 7/2041 |
| | | | | 342/354 |
| 2005/0013249 | A1 | 1/2005 | Kong et al. | |
| 2008/0063103 | A1 | 3/2008 | Lee et al. | |
| 2008/0225850 | A1 | 9/2008 | Oran et al. | |
| 2009/0034633 | A1* | 2/2009 | Rodirguez | H04L 1/0041 |
| | | | | 375/240.28 |
| 2009/0254600 | A1* | 10/2009 | Lee | H04N 21/4135 |
| | | | | 709/201 |
| 2010/0014618 | A1 | 1/2010 | Tsukio et al. | |
| 2010/0146580 | A1 | 6/2010 | Chen et al. | |
| 2011/0028088 | A1 | 2/2011 | Avellan et al. | |
| 2011/0035647 | A1 | 2/2011 | Eidson et al. | |
| 2011/0090958 | A1 | 4/2011 | Sridhar et al. | |
| 2011/0264966 | A1 | 10/2011 | Williams et al. | |
| 2013/0203343 | A1* | 8/2013 | Ling | H04H 20/08 |
| | | | | 455/12.1 |
| 2013/0322326 | A1 | 12/2013 | Medina et al. | |

OTHER PUBLICATIONS

International Search Report and Written Opinion for PCT/US13/77914, dated Jun. 9, 2014, all pages.

International Preliminary Report on Patentability for PCT/US13/77914, dated Jun. 30, 2015, all pages.

Office Action for European Patent Application No. 13869706.5 dated Feb. 15, 2017, all pages.

First Office Action for MX/a/2015/007591 dated Jun. 17, 2016, all pages.

Second Office Action for MX/a/2015/007591 dated Oct. 10, 2016, all pages.

Examination Report from the EPO for EP 13869706.5 dated Jan. 11, 2018, all pages.

* cited by examiner

ENHANCED RELIABILITY FOR SATELLITE DATA DELIVERY

CROSS-REFERENCE TO RELATED APPLICATION

This application is a continuation of U.S. Ser. No. 14/923,576, filed on Oct. 27, 2015, entitled, "ENHANCED RELIABILITY FOR SATELLITE DATA DELIVERY," which is a continuation of U.S. Ser. No. 13/776,726, filed on Feb. 26, 2013, entitled, "ENHANCED RELIABILITY FOR SATELLITE DATA DELIVERY," which claims the benefit of U.S. Provisional Application No. 61/746,531 filed on Dec. 27, 2012, and titled "ENHANCED RELIABILITY FOR SATELLITE DATA DELIVERY," the entire contents of each of which are hereby incorporated by reference for all purposes.

TECHNICAL FIELD

This disclosure relates to apparatus and methods of content display, and particularly to super-reliable satellite data delivery.

BACKGROUND

Data delivery via satellite can suffer from outages due to various adverse conditions. For example, adverse weather, such as heavy rain, can disrupt data delivery and compromise reliability of data delivery. This disruption is known as "rain fade." The disruption may last only for a short time in certain cases. Nonetheless, even a short disruption can be undesirable, particularly for mission-critical or otherwise important data. For mission-critical or otherwise important data, a method of ensuring much higher data reliability is needed.

Thus, there is a need for television systems that address the foregoing problem to provide users with better experiences. This and other needs are addressed by the present disclosure.

SUMMARY

Various methods, systems, and apparatus are disclosed for implementing a media device for content-based highlight recording of television programming.

In one aspect, a media device may be configured for receiving data from one or more satellites. The media device may include one or more processors and one or more storage devices coupled to the one or more processors and configured to store instructions to cause the one or more processors to one or more of: tune, by a first tuner of a media device (or a set-top box), to a first data stream that came from a first satellite transponder; tune, by a second tuner of the set-top box, to a second data stream that came from a second satellite transponder; wherein the first data stream and the second data stream were derived from source data based at least in part on a data distribution scheme, wherein the data distribution scheme comprises distributing at least portions of the source data with the first data stream and the second data stream; and process the first data stream and/or the second data stream to store and/or output for presentation content.

In another aspect, a method for receiving data from one or more satellites may include one or more of the following steps. A first tuner of a set-top box may be tuned to a first data stream that came from a first satellite transponder. A second tuner of the set-top box may be tuned to a second data stream that came from a second satellite transponder. The first data stream and the second data stream may be derived from source data based at least in part on a data distribution scheme. The data distribution scheme may include distributing at least portions of the source data with the first data stream and the second data stream. The first data stream and/or the second data stream may be processed to store and/or output for presentation content.

In yet another aspect, a system for receiving data from one or more satellites is provide. The system may include one or more processors and memory communicatively coupled with, and readable by, the one or more processors, the memory having stored therein processor-readable instructions, which, when executed by the one or more processors, may cause the one or more processors to perform a method. A first data stream that came from a first satellite transponder may be tuned to. A second data stream that came from a second satellite transponder may be tuned to. The first data stream and the second data stream may be derived from source data based at least in part on a data distribution scheme. The data distribution scheme may include distributing at least portions of the source data with the first data stream and the second data stream. The first data stream and/or the second data stream may be processed to store and/or output for presentation content.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures in conjunction with the description of certain embodiments presented herein. However, the appended figures should not be seen as limiting or defining the present disclosure.

Figure 1:
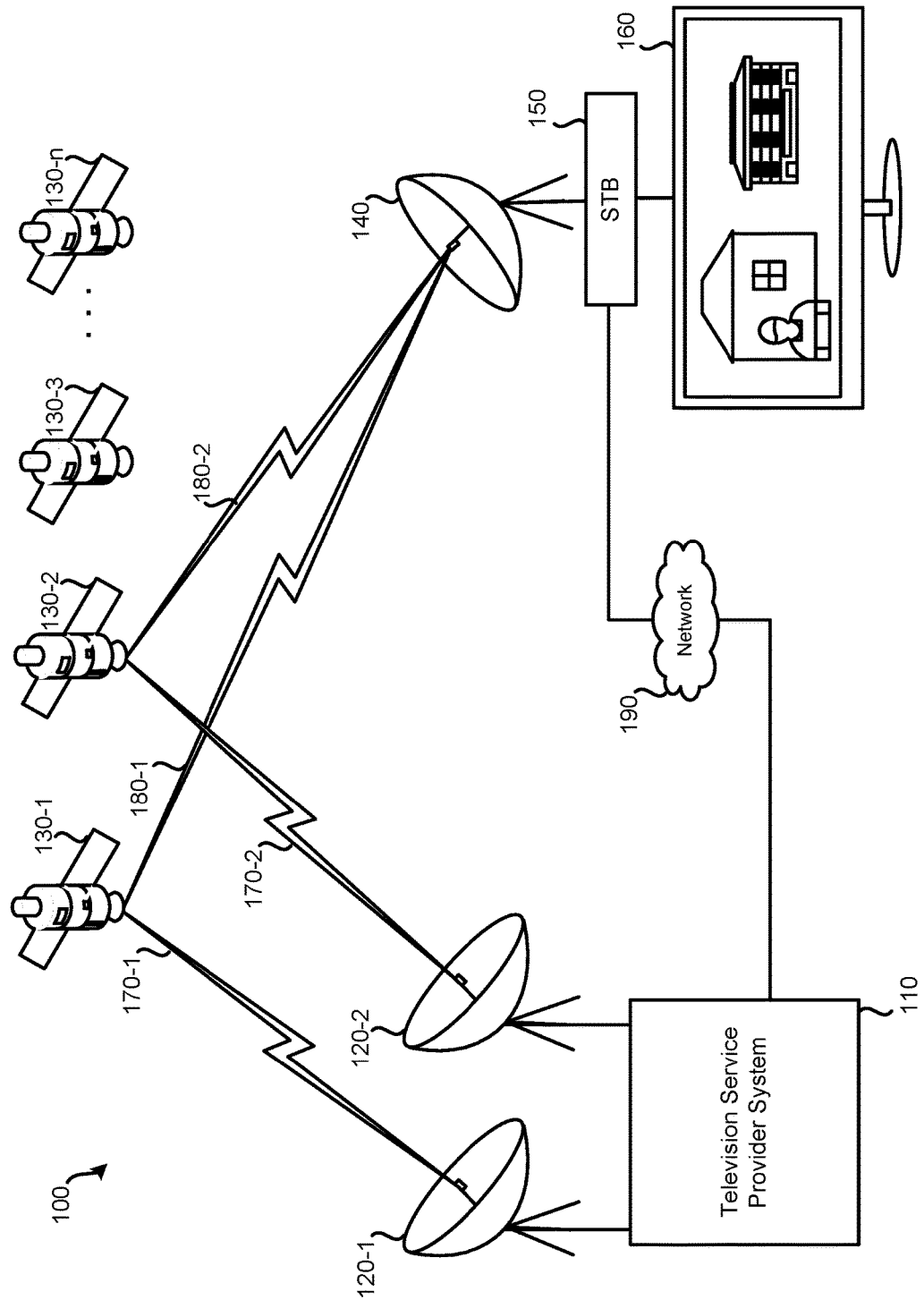
FIG. 1 illustrates a satellite television distribution system, in accordance with certain embodiments of the present disclosure.

In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Although embodiments detailed herein may be directed toward controlling television-based equipment, the principles easily can be extended to other types of content and devices, such as computer equipment, handheld electronic devices, and the like. In addition, the terms "television," "television service," and "television programming" can include traditional television programming, such as linear television programs, as well as other types of audio, video and/or audio/video content, such as on-demand video content, streaming video content and the like delivered via any type of content delivery systems, such as a cable, satellite, cellular/wireless, Internet/IP and/or any other content delivery technology or system currently known or hereafter developed. Furthermore, embodiments herein describe set-top boxes and/or other devices being connected with a television or other device having an electronic display. However, features disclosed herein can also be incorporated into the device having the electronic display, such as a television with an integrated cable, satellite or IPTV receiver.

Various methods, systems, and computer products are disclosed for super-reliable data delivery. Data distribution may be implemented in various ways according to various embodiments. Certain data distribution schemes may provide greater levels of redundancy of data. Certain data distribution schemes may provide greater levels of performance. Certain data distribution schemes may provide greater levels of availability. Certain data distribution schemes may provide greater levels of capacity. Certain embodiments may provide the combination of better bandwidth and reliability of losing an entire satellite and/or transponder and still being able to recover the data. It should be understood that, while the data distribution schemes according various embodiments are described in reference to multiple satellites, certain embodiments may implement the data distribution schemes with multiple transponders of the same satellite, or a combination of multiple transponders per satellite and multiple satellites.

FIG. 1 illustrates an embodiment of a satellite television distribution system 100. Satellite television distribution system 100 may include: television service provider system 110, satellite transmitter equipment 120, satellites 130, satellite dish 140, set-top box 150, and television 160. Alternate embodiments of satellite television distribution system 100 may include fewer or greater numbers of components. While only one satellite dish 140, set-top box 150, and television 160 (collectively referred to as "user equipment") are illustrated, it should be understood that multiple (e.g., tens, thousands, millions) instances of user equipment may receive television signals from satellites 130. For example, a particular person may have user equipment at multiple homes or other locations.

Television service provider system 110 and satellite transmitter equipment 120 may be operated by a television service provider. A television service provider may distribute television channels, on-demand programming, programming information, and/or other services to users via satellite. Television service provider system 110 may receive feeds of one or more television channels from various sources. Such television channels may include multiple television channels that contain the same content (but may be in different formats, such as high-definition and standard-definition). To distribute such television channels to users, feeds of the television channels may be relayed to user equipment via one or more satellites in the form of transponder streams. Satellite transmitter equipment 120 may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically to communicate with satellites 130. Such multiple instances satellite transmitting equipment may communicate with the same or with different satellites. Different television channels may be transmitted to satellites 130 from different instances of transmitting equipment. For instance, a different satellite dish of transmitting equipment 120 may be used for communication with satellites in different orbital slots.

Satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from transponder stream 180. Satellites 130 may be in geosynchronous orbit. Each satellite 130 may be in a different orbital slot, such that the signal path between each satellite, uplink stations, and user equipment vary. Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be carried on a first transponder of satellite 130-1. A third, fourth, and fifth television channel may be carried using a different satellite or a different transponder of the same satellite relaying the transponder stream at a different frequency. By way of example without limitation, a transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 140 may be a piece of user equipment that is used to receive transponder streams from one or more satellites, such as satellites 130. Satellite dish 140 may be provided to a user for use on a subscription basis to receive television channels provided by the television service provider system 110, transmitter equipment 120, and/or satellites 130. Satellite dish 140 may be configured to receive transponder streams from multiple satellites and/or multiple transponders of the same satellite. Satellite dish 140 may be configured to receive television channels via transponder streams on multiple frequencies. Based on the characteristics of set-top box (STB) 150 and/or satellite dish 140, it may only be possible to capture transponder streams from a limited number of transponders concurrently. For example, a tuner of STB 150 may only be able to tune to a single transponder stream from a transponder of a single satellite at a time.

In communication with satellite dish 140, may be one or more sets of receiving equipment. Receiving equipment may be configured to decode signals received from satellites 130 via satellite dish 140 for display on a display device, such as television 160. Receiving equipment may be incorporated as part of a television or may be part of a separate device, commonly referred to as a set-top box (STB). Receiving equipment may include a satellite tuner configured to receive television channels via a satellite. In FIG. 1, receiving equipment is present in the form of set-top box 150. As such, set-top box 150 may decode signals received via satellite dish 140 and provide an output to television 160.

Television 160 may be used to present video and/or audio decoded by set-top box 150. Set-top box 150 may also output a display of one or more interfaces to television 160, such as an electronic programming guide (EPG). In some embodiments, a display device other than a television may be used.

Uplink signal 170-1 represents a signal between transmitter equipment 120 and satellite 130-1. Uplink signal 170-2 represents a signal between transmitter equipment 120 and satellite 130-2. Each of uplink signals 170 may contain streams of one or more different television channels. For example, uplink signal 170-1 may contain a certain group of television channels, while uplink signal 170-2 contains a different grouping of television channels. Each of these television channels may be scrambled such that unauthorized persons are prevented from accessing the television channels.

Transponder stream 180-1 represents a signal between satellite 130-1 and satellite dish 140. Transponder stream 180-2 represents a signal path between satellite 130-2 and satellite dish 140. Each of transponder streams 180 may contain one or more different television channels in the form of transponder streams, which may be at least partially scrambled. For example, transponder stream 180-1 may include a first transponder stream containing a first group of television channels, while transponder stream 180-2 may include a second transponder stream containing a different group of television channels. A satellite may transmit multiple transponder streams to user equipment. For example without limitation, a typical satellite may relay 32 transponder streams via corresponding transponders to user equipment. Further, spot beams are possible. For example, a satellite may be able to transmit a transponder stream to a particular geographic region (e.g., to distribute local television channels to the relevant market). Different television channels may be transmitted using the same frequency of the transponder stream to a different geographic region.

FIG. 1 illustrates transponder stream 180-1 and transponder stream 180-2 being received by satellite dish 140. For a first group of television channels, satellite dish 140 may receive a transponder stream of transponder stream 180-1; for a second group of channels, a transponder stream of transponder stream 180-2 may be received. STB 150 may decode the received transponder stream. As such, depending on which television channel(s) are desired, a transponder stream from a different satellite (or a different transponder of the same satellite) may be accessed and decoded by STB 150. Further, while four satellites are depicted in satellite television distribution system 100, in other embodiments greater or fewer numbers of satellites may be present for receiving and transmitting transponder streams to user equipment.

Network 190 may serve as a secondary communication channel between television service provider system 110 and set-top box 150. While satellite dish 140 provides a first communication channel with television service provider system 110 by receiving television channels and possibly other data from satellites 130, a second communication channel between set-top box 150 and television service provider system 110 allows for data to be transmitted by set-top box 150 to the television service provider and/or data to be transmitted to set-top box 150. Via such a secondary communication channel, bidirectional exchange of data may occur. Network 190 may be separate from the satellite-based television distribution system that relies on satellites 130. Data from the STB may be transmitted to television service provider system 110 via network 190. Data may also be transmitted from television service provider system 110 to STB 150 via network 190. Network 190 may represent one or more networks, such as the Internet and/or some other network, such as a home WiFi network or modem. While audio and video services may be provided to STB 150 via satellites 130, feedback from STB 150 to television service provider system 110 may be transmitted via network 190. Not all STBs may be able to communicate via network 190. For example, even if an STB is capable of communicating using network 190, communication using network 190 may require that the user has an active account with an internet service provider. Accordingly, some STBs may only be able to receive data from satellites 130 via receiving equipment such as satellite dish 140. In other situations, while a user may have an active ISP account, such as via a fiber, cable, or DSL internet connection, equipment failure may occur. For instance, a router through which STB 150 uses to connect to network 190 may fail or be in need of resetting.

FIG. 1 illustrates an example of a satellite-based television channel distribution system. It should be understood that at least some of the aspects of such a system may be similar to a cable television distribution system. For example, in a cable television system, rather than using satellite transponders, multiple RF channels on a cable may be used to transmit streams of television channels. As such, aspects detailed herein may be applicable to cable television distribution systems. While FIG. 1 illustrates a single STB 150 in communication with television service provider system 110, it should be understood that many STBs may be in communication with television service provider system 110.

Figure 2:
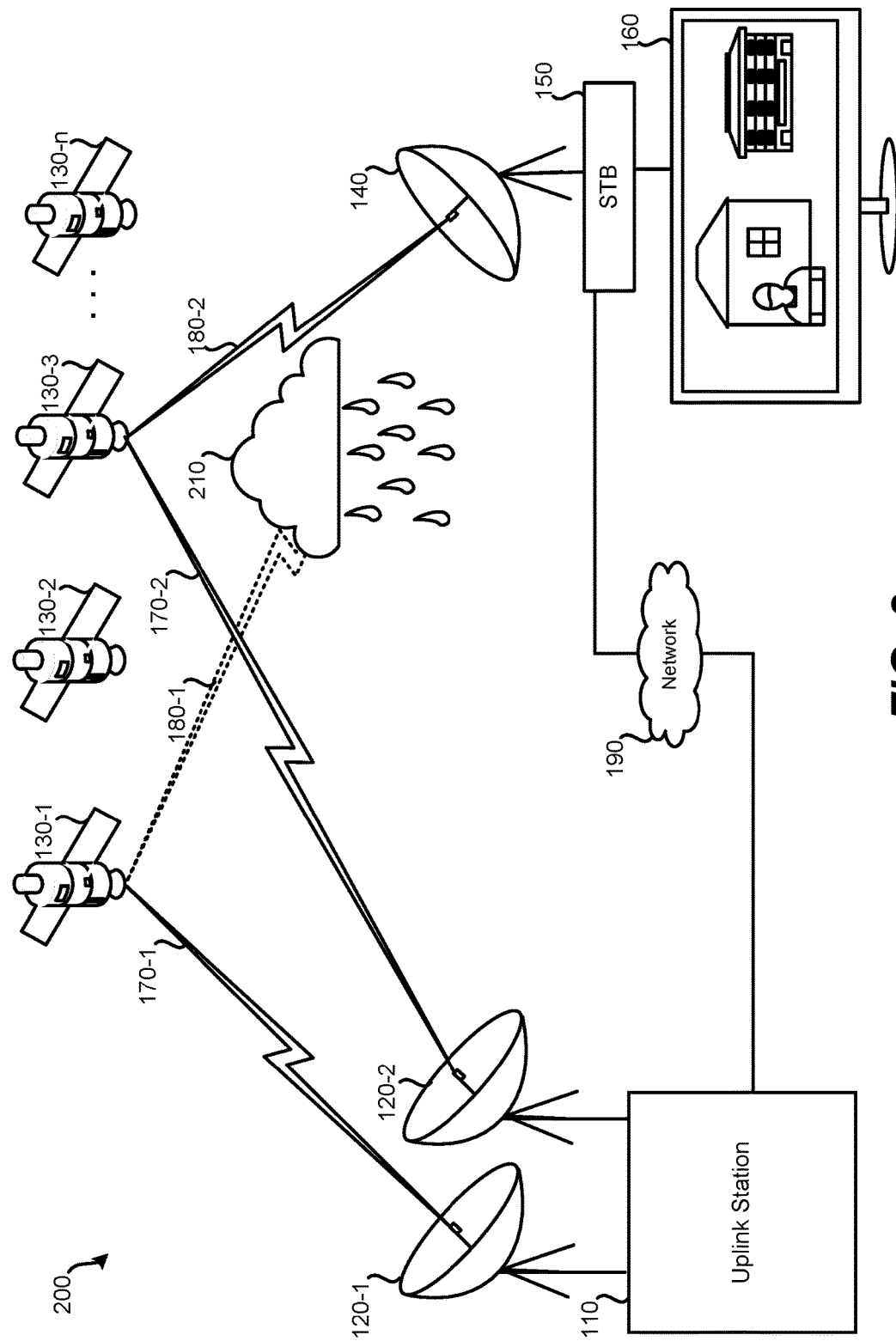
FIG. 2 illustrates a satellite television distribution system, in accordance with certain embodiments of the present disclosure.

FIG. 2 illustrates an embodiment of a satellite television distribution system 200, in accordance with certain embodiments of the present disclosure. As depicted, weather may interfere with reception of one or more television channels. Satellite television system 200 may represent satellite television system 100 of FIG. 1 with the addition of a rainstorm 210 obstructing satellite dish 140 from adequately receiving downlink signal 180-1. In FIG. 2, a rainstorm is used as an example of one type of occurrence that may prevent one or more television channels from being received successfully by user equipment (satellite dish 140, set-top box 150, and/or television 160). Other occurrences that may prevent one or more television channels from being successfully received by user equipment may include: a satellite outage, an outage of one or more particular transponders of a satellite, an outage at uplink station 110, an outage at satellite uplink 120, an uplink signal not being received by the proper satellite of satellites 130, and/or the television channel not being initially received by uplink station 110.

In the example of FIG. 2, due to the current location of rainstorm 210, satellite dish 140 is obstructed from successfully receiving downlink signal 180-1. As such, television channels transmitted via satellite 130-1 via downlink signal 180-1 may not be successfully received. Likewise, the satellite 130-2 may not be positioned for a successful transmission, with the rainstorm 210 obstructing the path from the satellite 130-2 to the satellite dish 140. The satellite 130-3, however, may be well positioned for successful transmission, not being obstructed by the rainstorm 210; television channels transmitted via satellite 130-3 via downlink signal 180-2 may be successfully received. Therefore, with respect to television 160, one or more channels from satellites 130-1, 130-2 (or specific transponders thereof) may be unavailable; channels from other satellites (or other transponders thereof) may remain available. As rainstorm 210 moves, downlink signal 180-1 may again become available; another downlink signal, such as downlink signal 180-2, may become unavailable.

However, the satellite television system 200 may be configured for implementing one or more satellite data distribution schemes, in accordance with certain embodiments of the present disclosure. In various embodiments, a set-top box may have access to two, three, four, or more satellites 130—any suitable number of satellites. Similarly, in various embodiments, a set-top box may have access to any suitable number of transponders. The satellites 130 and/or transponders may be coordinated to serve in combination as a data delivery system that provides greater reliability. In various embodiments, data may be separated, replicated, and distributed across two or more of the satellites 130 and/or transponders.

Data distribution may be implemented in various ways according to various embodiments. Certain data distribution schemes may provide greater levels of redundancy of data. Certain data distribution schemes may provide greater levels of performance. Certain data distribution schemes may provide greater levels of availability. Certain data distribution schemes may provide greater levels of capacity. Certain embodiments may provide the combination of better bandwidth and reliability of losing an entire satellite and/or transponder and still being able to recover the data. It should be understood that, while the data distribution schemes according various embodiments are described in reference to multiple satellites, certain embodiments may implement the data distribution schemes with multiple transponders of the same satellite, or a combination of multiple transponders per satellite and multiple satellites.

In certain data distribution schemes, duplicated data may be split between two satellites 130. A pair of uplink signals 170 may each contain a duplicate stream of one or more television channels. For example, uplink signal 170-1 may contain a certain group of television channels, while uplink signal 170-2 contains another instance of that group of television channels. Accordingly, each of two satellites 130 may receive a complete mirrored set of data. Therefore, particular end-user equipment may be serviced by either or both of the satellites 130. Thus, in one example scenario, due to the current location of rainstorm 210, satellite dish 140 may be obstructed from successfully receiving downlink signal 180-1 from the satellite 130-1. However, as the satellite 130-2 may transceive a complete mirrored set of the data, the satellite 130-2 may service the satellite dish 140 via downlink signal 180-2 with the same channels that would normally be available with the downlink signal 180-1.

In some embodiments, as depicted, multiple satellite uplinks 120 may be employed to separately provide the duplicate streams. Such a configuration may lend greater reliability to the system. However, in other embodiments, a single satellite uplink 120 may be employed to provide the duplicate streams.

Figure 3:
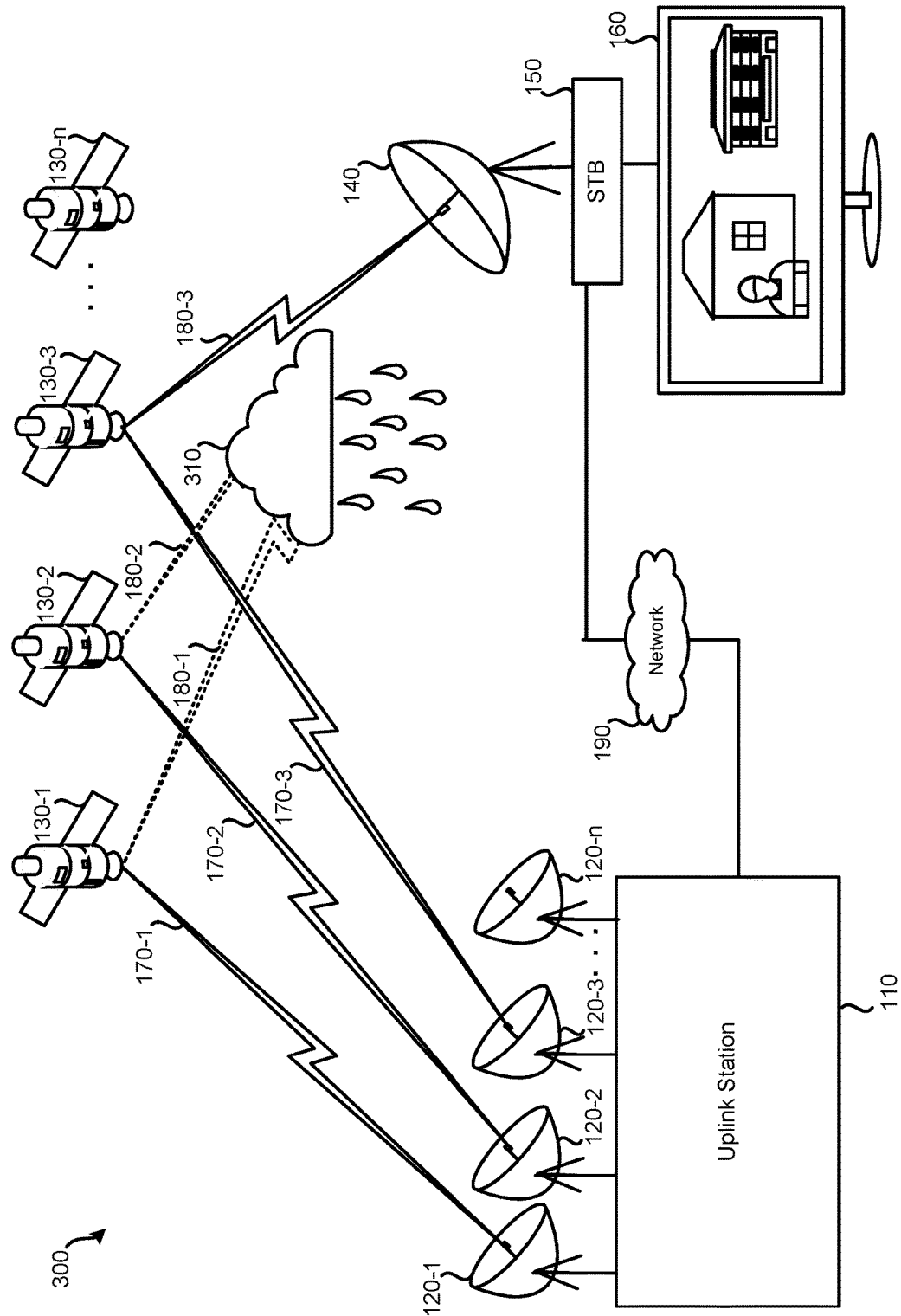
FIG. 3 illustrates a satellite television distribution system, in accordance with certain embodiments of the present disclosure.

Data distribution based on replicated data streams may be extended to three, four, or more replicated streams. FIG. 3 illustrates an embodiment of a satellite television distribution system 300, in accordance with certain embodiments of the present disclosure. In some data distribution schemes, data may be replicated and split amongst three or more satellites 130. In certain embodiments, signals 170, 180 may correspond to television signals, data signals, and/or mission-critical data. Three or more uplink signals 170 may each contain a replicated stream of one or more television channels. For example, uplink signals 170-1, -2, -3 may each contain an instance of a certain group of television channels. Accordingly, each of the three or more satellites 130 may receive a complete mirrored set of the data. Therefore, particular end-user equipment may be serviced by any one or combination of the three or more satellites 130. Thus, in one example scenario, due to the current location of rainstorm 210, satellite dish 140 may be obstructed from successfully receiving downlink signals from the satellites 130-1 and 130-2, but, as the satellite 130-3 may possess a complete mirrored set of the data, the satellite 130-3 service the satellite dish 140 via downlink signal 180-3.

In some embodiments, multiple replicated downlink signals may be received or receivable by the set-top box 150 with satellite dish 140 at one time. In some embodiments, upon disruption of one downlink signal, the set-top box 150 with satellite dish 140 may be configured to tune to another downlink signal from a different satellite. In some embodiments, an idle tuner may be identified and used for that purpose.

In some embodiments, communications between the set-top box 150 and the television service provider system 110 after a downlink signal is disrupted or otherwise not received by the set-top box 150. In some embodiments, if set-top box 150 is unable to successfully receive a television channel, a message may be transmitted to the television service provider system 110. The television service provider system 110 may receive such indications from multiple set-top boxes (or, more generally, receiving equipment). Such data may assist a television service provider in identifying television channel outage areas due to weather or some other occurrence.

The television service provider system 110 could respond accordingly by implementing a data distribution scheme responsive to a notification of the failure. In other embodiments, a data distribution scheme may be implemented as a default and already be employed prior to any failure. For example, the television service provider system 110 may coordinate uplink signals to various satellites according to a data distribution scheme. In some embodiments, the television service provider system 110 may direct the set-top box 150 to an alternative satellite 130 and/or transponder. For example, the television service provider system 110 may send a message, instructions, and/or other information via the network 190 to the set-top box 150 so that the set-top box 150 may receive one or more downlink signals from another satellite(s) and/or transponders. Such information may be provided by the television service provider system 110 to multiple sets of receiving equipment, such as set-top box 150. Such information may be provided to set-top box 150 as a push (a message sent to set-top box 150 following the problem being detected) or a pull (a message sent to set-top box 150 upon receiving a communication from set-top box 150). For example, in the case of a pull, a user may attempt to tune to an unavailable channel. Information, if available, about the unavailable channel may be attempted to be retrieved by set-top box 150 from the television service provider system 110. In other embodiments, the set-top box 150 may be pre-configured to tune to one or more secondary satellites 130 and/or transponders.

In certain data distribution schemes, sequential data may be logically segmented such that different segments are provided to multiple satellites 130. The satellites 130, having the different segments may provide multiple transponder streams to the end-user equipment sequentially or concurrently. Thus, in some embodiments, different transponder streams, each containing different segments, may be provided in parallel. This may provide greater throughput. This may provide quicker data access, particularly with set-top boxes having several tuners and demodulators available.

In some embodiments, sequential data segments may be alternately and/or regularly interleaved between/among multiple satellites 130 and/or transponders. In some embodiments, sequential data segments may be interleaved between/among multiple satellites 130 and/or transponders with a round-robin approach. In some embodiments, the multiple satellites 130 may be physically positioned in a sequential fashion, and sequential data segments may be alternately and/or regularly interleaved between/among the satellites 130 in a manner that corresponds to the physical positioning sequence. In other embodiments, the interleaving of sequential data segments may not correspond to the physical positioning sequence of the satellites 130. The interleaving of sequential data segments according to various embodiments may allow for enhanced throughput and data processing performance. Multiple satellites 130 and/or transponders may communicate simultaneously with parallel communication. By way of example without limitation, two or more uplink signals 170 may each contain a segmented sequential data corresponding to one or more television channels.

In some data distribution schemes, data may be split amongst multiple satellites 130 with redundancy information such that if data is lost from any one satellite 130, there is enough information in the rest of the satellites 130 that the data is recoverable. The lost portion could be recreated so that the full data set is available. Distributing data across multiple satellites may ensure extremely high reliability without the need to fully duplicate all the data for each satellite. Thus, certain embodiments may split data amongst multiple streams. For example without limitation, data may be split amongst five different streams. Data may be recoverable from a subset of those streams, as long as necessary information is conveyed with the subset of those streams. For example without limitation, in the case of five total streams, data may be recoverable from a subset of four of out of the five streams.

In certain data distribution schemes, the sequential data segments interleaved between/among multiple satellites 130 and/or transponders may additionally be replicated and distributed to additional satellites 130 and/or transponders. By way of example without limitation, sequential data segments may be interleaved between the satellites 130-1 and 130-2, and the sequential data segments may be mirrored to the satellites 130-3 and 130-4. Accordingly, segmented data distribution transmissions to the satellites 130-1 and 130-2 may allow for improved performance, while replicated segmented data distribution transmissions to the satellites 130-3 and 130-4 may provide for fault tolerance.

Figure 4:
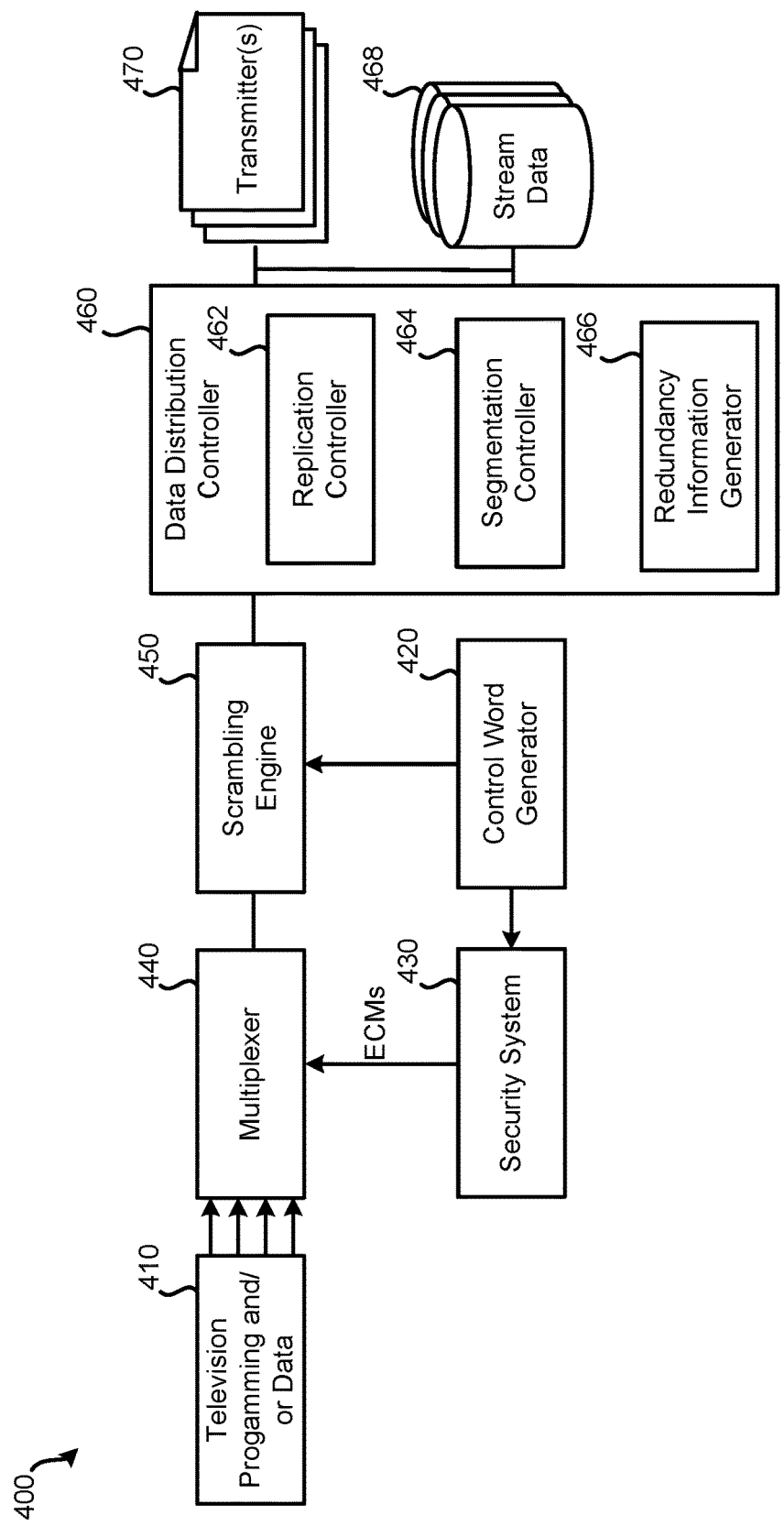
FIG. 4 illustrates a television service provider data handling system, in accordance with certain embodiments of the present disclosure.

FIG. 4 illustrates an embodiment of a television service provider data handling system 400, in accordance with certain embodiments of the present disclosure. The data handling system 400 may be part of television service provider system 110. As such, before data is transmitted to set-top boxes via satellite, the data handling system 400 may be used to prepare data streams for data distribution schemes according to various embodiments. The data handling system 400 may include: television programming and/or data module 410, control word generator 420, security system 430, multiplexer 440, scrambling engine 450, stream controller 440, stream data repository 468, and/or transmitters 470.

In various embodiments, the television service provider data handling system 400 may include any device or set of devices configured to compute, process, organize, categorize, qualify, send, receive, retrieve, generate, convey, store, display, present, detect, handle, and/or use any form of information and/or data suitable for embodiments described herein. The television service provider data handling system 400 could include a single computing device, a server, for example, or multiple computing devices, which may be implemented in or with a distributed computing and/or cloud computing environment with a plurality of servers and cloud-implemented resources.

The data handling system 400 may receive data and/or television content from one or more television channels from one source or multiple different sources, such as directly from the networks that produced the content on the television channels. Each television channel that is to be transmitted on a particular transponder stream via a transponder of a satellite may be provided to multiplexer 440. Multiplexer 440 may create a digital stream of data packets containing the video, audio, and other data, such as entitlement control messages (ECMs), to be transmitted on the transponder data stream. The data stream, which includes video and/or audio data packets that are not scrambled, may be passed to scrambling engine 450. Scrambling engine 450 may use a control word to scramble video or audio present in a data packet. Some audio and video packets may also pass through with no scrambling, if desired by the television service provider.

Control word generator 420 may generate the control word that is used by scrambling engine 450 to scramble the video or audio present in the data packet. Control words generated by control word generator 420 may be passed to security system 430, which may be operated by the television service provider or by a third-party security provider. The control words generated by control word generator 420 may be used by security system 430 to generate an ECM. Each ECM may indicate two control words. The control words indicated may be the current control word being used to scramble video and audio, and the control word that will next be used to scramble video and audio. Security system 430 may output an ECM to multiplexer 440 for transmission to subscribers' set-top boxes. Each data packet, whether it contains audio, video, an ECM, or some other form of data, may be associated with a particular PID. This PID may be used by the set-top box in combination with the networking information table to determine which television channel the data contained within the data packet corresponds. Accordingly, the transponder data streams may contain scrambled video packet stream and audio packet stream and also an encrypted ECM packet stream which contains the control words necessary to descramble the scrambled video and audio packets.

The data handling system 400 may be configured for facilitating one or more satellite data distribution schemes, in accordance with certain embodiments of the present disclosure. The data distribution controller 460 may be configured to manage how data is separated, replicated, distributed, and/or otherwise prepared for two or more data streams. The functions of the data distribution controller 460 may be implemented in software and/or hardware. In some embodiments, as depicted, the data distribution controller 460 may be employed downstream with respect to certain components, such as the scrambling engine 450; in alternative embodiments, the data distribution controller 460 may be employed upstream with respect to certain components, such as the scrambling engine 450.

In some embodiments, the data distribution controller 460 may include one or more replication controllers 462. The replication controller 462 may be configured to replicate data for distribution with two or more separate data streams. The replication controller 462 may receive a digital stream of data packets containing the video, audio, and other data, replicate the digital stream components, and buffer the components for transmission and/or further processing. In various embodiments, the replication controller 462 may access data from the segmentation controller 464, such as segmented data sets, and/or from one or more data repositories 468. Having replicated data, the replication controller 462 may stage the identical data sets in one or more data repositories 468, in some embodiments. In some embodiments, each set of data is stage in a separate repository 468. In some embodiments, the identical data sets may be provided directly to the one or more transmitters 470.

In some embodiments, the data distribution controller 460 may include one or more segmentation controllers 464. The segmentation controller 464 may be configured to logically segment the digital stream such that different segments are provided for different transponder data streams. The segmentation controller 464 may receive a digital stream of data packets containing the video, audio, and other data, divide the digital stream into components, and buffer the resultant components for transmission and/or further processing. In some embodiments, the segmentation controller 464 may stage the segmented data in one or more stream data repositories 468. In some embodiments, certain segmented sets of data are segregated into certain repositories 468. In some embodiments, the segmented data may be provided directly to the one or more transmitters 470. In some embodiments, segmentation controller 464 may provide segmented data to multiple repositories 468 or transmitters 470 simultaneously.

Various embodiments may employ various levels of division. For example, in some embodiments, the level of division may be packet-based, byte-based, and/or bit-based. Groupings of one or more packets may be segment for different routing. However, any suitable level of division, including any suitable segmentation size, may be employed. In some embodiments, the segmentation size may depend on the number of transponder streams to be provided. In some embodiments, the segmentation size may depend on other factors, such as storage, transfer, and/or processing constraints and/or performance characteristics. The segmented components may be distributed in the same way for transmission with multiple transponder streams.

With the data distribution controller 460 having prepared data for transponder data streams, two or more transponder data streams may be transmitted by one or more transmitters 470 to one or more satellites, such as satellite(s) 130, for relay to subscribers' set-top boxes, such as STB 150. In some embodiments, multiple transponder data streams may be transmitted by a single transmitter 470 to one or more satellites. In some embodiments, multiple transmitters 470 may be used to transmit the transponder data streams to one or more satellites. In some embodiments, a separate transmitter 470 per transponder stream may be used for transmission. In various embodiments, data may be separated, replicated, and/or distributed across two or more of the satellites and/or transponders.

For simplicity, the data handling system 400 has been reduced to a block diagram, other common components have been omitted. Further, some routing between the various modules of the data handling system 400 has been illustrated. Such illustration is for exemplary purposes only. Regardless of whether two modules are directly or indirectly connected, the modules may be able to communicate. Connections between modules are intended only to indicate possible common routing. It should be understood that the modules of the data handling system 400 may be combined into a fewer number of modules or divided into a greater number of modules.

Figure 5:
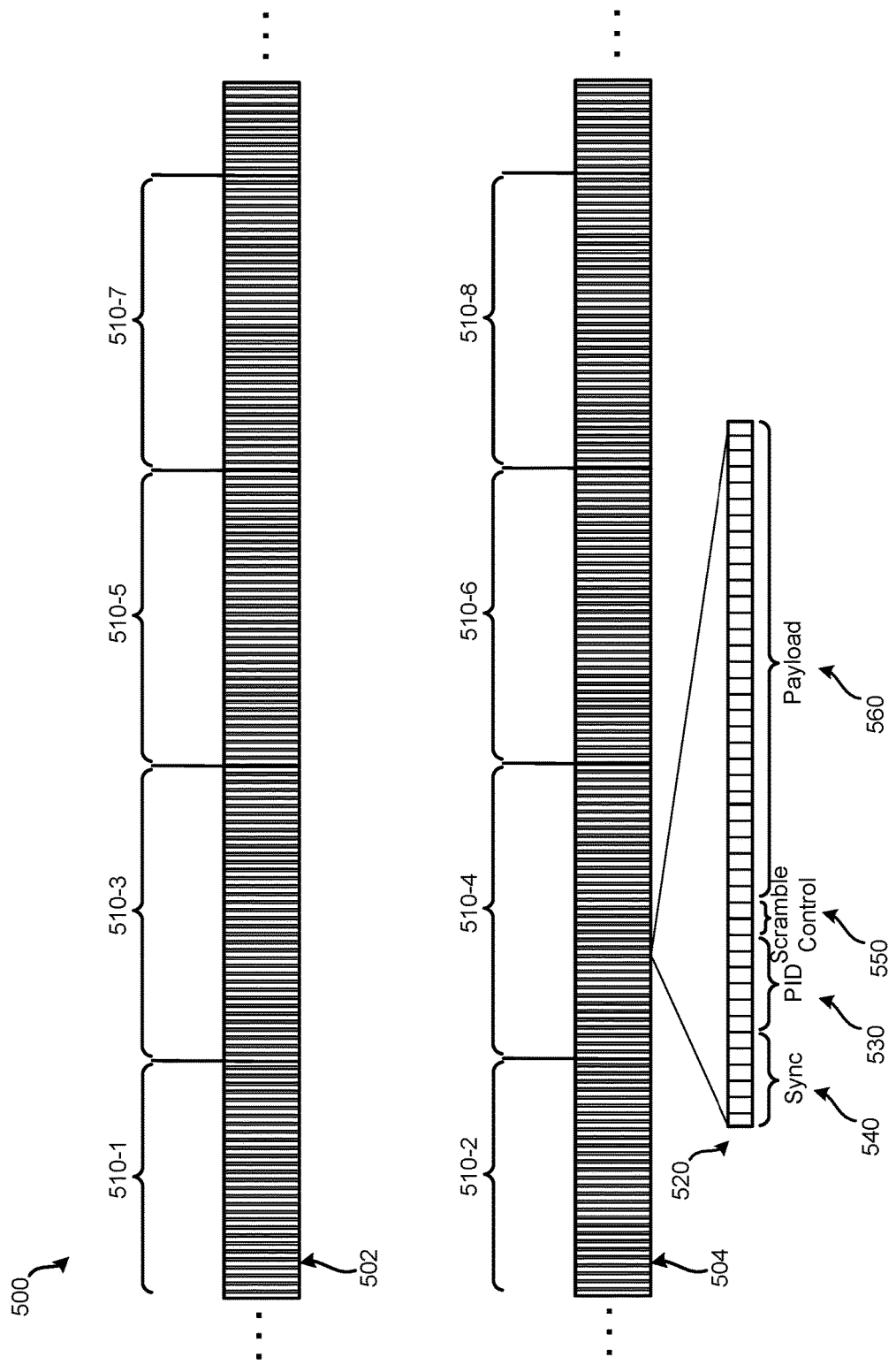
FIG. 5 illustrates a data transmission for one possible data distribution scheme where data may be segmented such that different segments are provided for different transponder data streams, in accordance with certain embodiments of the present disclosure.

FIG. 5 illustrates an embodiment of data transmission 500 for one possible data distribution scheme where data may be segmented such that different segments are provided for different transponder data streams, in accordance with certain embodiments of the present disclosure. In FIG. 5, transponder data streams 502 and 504 are illustrated. The first transponder data stream 502 may include video, audio, and/or other data corresponding to a first segment 510-1. The second transponder data stream 504 may include video, audio, and/or other data corresponding to a second segment 510-2. The second segment 510-2 may sequentially and/or logically follow the first segment 510-1. Likewise, the first transponder data stream 502 may include video, audio, and/or other data corresponding to a third segment 510-3, and the second transponder data stream 504 may include video, audio, and/or other data corresponding to a fourth segment 510-4, sequential and/or logical order. As depicted, the interleaving may continue in the same manner up to segments 510-5, -6, -7, -8, and/or -n.

In some embodiments, a segment 510 may include one or more data packets. A data packet 520 illustrates an exemplary video or audio packet. Data packet 520 may contain at least: sync 540, PID 530, scramble control 550, and payload 560. The packet header of the packet (which may be an MPEG packet) may include sync 540 (which may be first), PID 530, and scramble control 550. As a reference, MPEG Systems Document 13818-1 lists the specifications in detail. PID 530 may be a packet identifier used to indicate the particular television channel (or other type of data, such as an ECM) with which the data packet is associated. Multiple video packets associated with the same PID may be referred to as a video packet stream, likewise for ECMs and audio packets.

A network information table (NIT) may store information useable by a set-top box to access various television channels. Information that may be present in a NIT may include: television channel numbers, a satellite identifier, a frequency identifier, a transponder identifier, an ECM PID, one or more audio PIDs, and a video PID. (A second audio PID of a channel may correspond to a second audio program (SAP), such as in another language.) In some embodiments, a NIT may be divided into additional tables. For example, rather than the specific audio PIDs and video PIDs being present in a NIT, a channel identifier may be present within the NIT which may be used to lookup the audio PIDs and video PIDs in another table.

Table 1 provides a simplified example of a NIT for several television channels. It should be understood that in other embodiments, many more television channels may be represented in a NIT. NIT may be periodically updated by a television service provider. As such, television channels may be reassigned to different satellites and/or transponders, and a STB may be able to handle this reassignment as long as the NIT is updated.

TABLE 1

| Channel | Satellite | Transponder | ECM PID | Audio PIDs | Video PID |
| --- | --- | --- | --- | --- | --- |
| 4 | 1 | 2 | 27 | 1001 | 1011 |
| 5 | 2 | 11 | 29 | 1002 | 1012 |
| 7 | 2 | 3 | 31 | 1003 | 1013 |
| 13 | 2 | 4 | 33 | 1003, 1004 | 1013 |

It should be understood that the values provided in Table 1 are for example purposes only. Actual values, including how satellites and transponders are identified, may vary. Additional information may also be stored in a NIT. Video and/or audio for different television channels on different transponders may have the same PIDs. Such television channels may be differentiated based on which satellite and/or transponder to which a tuner is tuned. Whether a user directly tunes to a television channel or a DVR tunes to a first television channel, a NIT may be used to determine the satellite, transponder, ECM PID (packet identifier), audio PID, and video PID.

Referring to Table 1, if a particular television channel is attempting to be accessed, such as television channel four, using the NIT, the STB may be able to determine that a data packet with a PID of 1001 corresponds to audio for channel 5, a data packet with a PID of 1011 corresponds to video for channel 5, and a data packet with a PID of 27 corresponds to an ECM for channel 5. Sync 540 may contain some number of bits that are used to synchronize with the transport stream. Scramble control 550 may serve to indicate which control word, if any, should be used to descramble payload 540. In some embodiments, scramble control 550 may indicate either an even control word or an odd control word is to be used for descrambling. In a video or audio packet, payload 560 may contain scrambled video or audio, respectively.

When a data packet is received that indicates a PID corresponding to an ECM of a television channel desired to be recorded or viewed, the encrypted ECM in the payload may be passed to a smart card for decryption. As the control word used for descrambling is changed over time, so is the ECM. Each ECM may contain the currently used control word for descrambling and the control word that will be used for descrambling next. As such, an ECM may contain one control word that is the same as the previous ECM and a new control word. For example, an ECM may be represented in the format of ($CW_{odd}$, $CW_{even}$). Whether the even or the odd control word is used for descrambling may be based on the scramble control identifier present within a data packet.

For the segment 510-1, an odd control word, $CW_1$, may be used for descrambling. During this period, the same ECM may be received multiple times (which may allow a set-top box that just tuned to the transponder stream to access television channels using the ECM's CWs as soon the ECMs are decrypted and the CW recovered). This ECM may include encrypted ($CW_1$, $CW_2$). As such, the ECM indicates the current control word ($CW_1$) and the next control word to be used ($CW_2$). During a time period corresponding to segment 510-1, data packets containing scrambled data may have scramble control bits that indicate the odd control word should be used for descrambling, as such $CW_1$ may be used for descrambling.

Starting at the beginning of segment 510-2, the scramble control bits of a data packet containing scrambled video or audio may indicate the even control word should be used, as such $CW_2$, may be used for descrambling. A different ECM may be transmitted to the STB that indicates the current control word and the next control word to be used. This ECM may be transmitted periodically during a time period corresponding to segment 510-2, such as every tenth of a second. In this instance for transponder stream 504, the ECM may indicate: ($CW_4$, $CW_2$). As such, the current control word $CW_2$ remains the same and continues to be used for descrambling for segment 510-2 during which the data packets indicate, via their scramble control bits, that the even control word is to be used for descrambling. When decrypted, the new ECM indicates a new odd control word, $CW_4$, which will be used for descrambling when the scramble control bits indicate the odd control word should be used for descrambling. This process may continue, with descrambling switching between the even and odd control words as long as the STB is tuned to the transponder streams. In some embodiments, a time period during which any particular control word is used may be approximately 10 seconds. Such a time period may allow ample time for a smartcard to decrypt an ECM such that the next control word to be used will be decrypted by the smart card prior to data packets being received that indicate, via the scramble control bits, that this next control word is to be used for descrambling.

Transponder data streams 502 and 504 may contain audio and video for multiple television channels, the packets of which may be indicated by different PIDs. In some embodiments, a single CW may be used for a discreet time period corresponding to a segment 510, however it should be understood that different CWs may be decrypted from different ECMs for different television channels. As such, certain CWs may be for one (or more than one) television channel, while other CWs (decrypted from other ECMs) may be used for other television channels within the same transponder stream.

While data packet 520 indicates only sync 540, PID 530, scramble control 550, and payload 560 as parameters that are present, it should be understood that data may be present that corresponds to other parameters, such as other header parameters. Further, based on the embodiment, the number of bits or bytes present in scramble control 550, payload 560, PID 530, sync 540 and/or any other parameter may vary. The boxes present in data packet 520 are not intended to be representative of a particular number of bits or bytes.

Referring again to FIG. 4, in some embodiments, segmented data may be replicated to provide redundancy in addition to improved performance. For example, the replication controller 462 may replicate segmented data. The replicated segmented data may be provided for separate transponder data streams. For example, segmented data may be provided for two or more transponder data streams, and that segmented data may be replicated to provide for two or more replicated transponder data streams such that four or more total transponder data streams may be provided by transmitter(s) 470.

Figure 6:
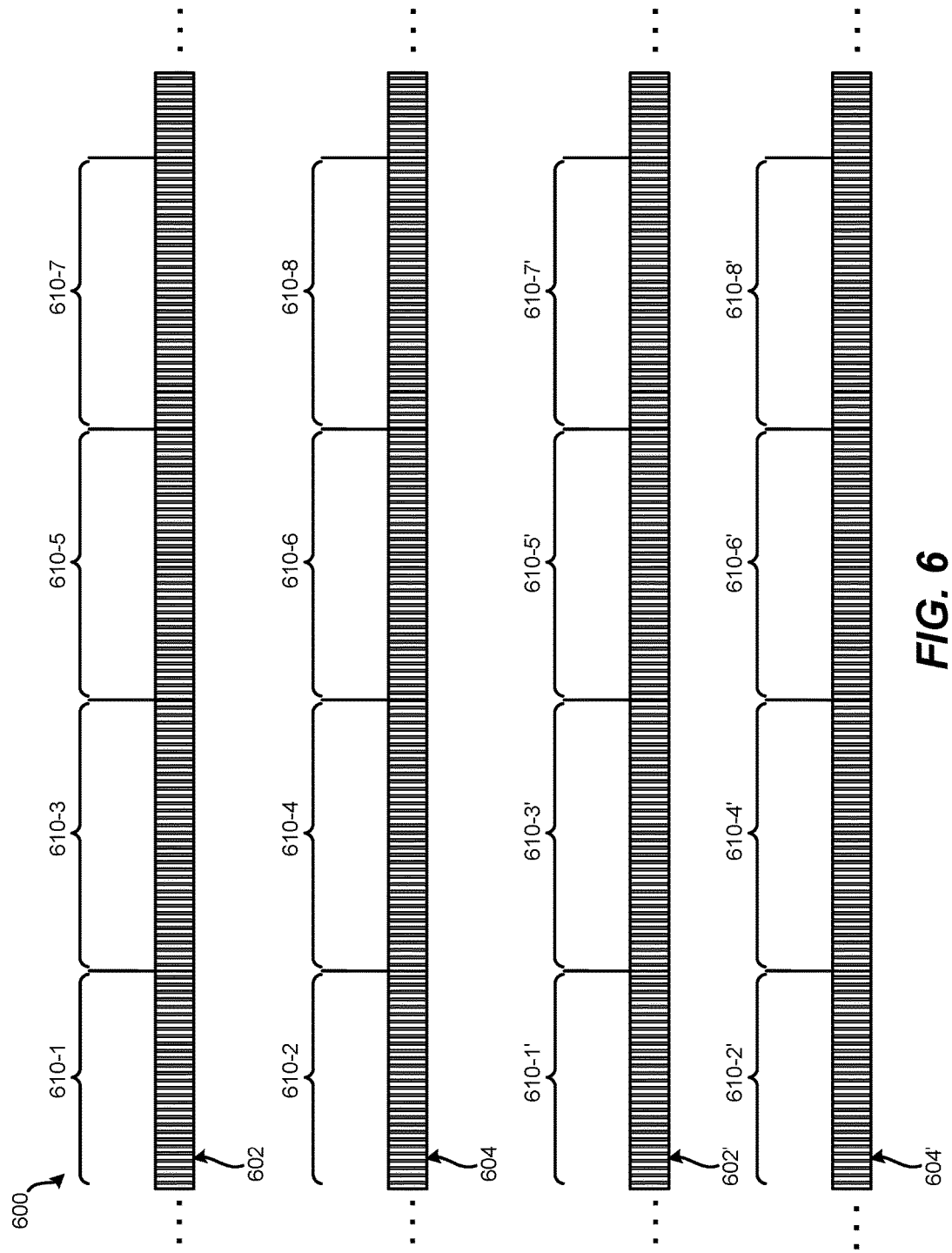
FIG. 6 illustrates a data transmission for one possible data distribution scheme where segmented data may be replicated to provide redundancy, in accordance with certain embodiments of the present disclosure.

FIG. 6 illustrates an embodiment of data transmission 600 for one possible data distribution scheme where segmented data may be replicated to provide redundancy, in accordance with certain embodiments of the present disclosure. In FIG. 6, transponder data streams 602 and 604 are illustrated. The transponder data streams 602 and 604 may correspond to the transponder data streams 502 and 504 previously described with respect to data transmission 500; and segments 610-1-610-n may correspond to the segments 510-1-510-n of the transponder data streams 502 and 504. Thus, like the transponder data streams 502 and 504 described previously, the transponder data streams 602 and 604 illustrate embodiments where data may be segmented such that different segments are provided for different transponder data streams. Additionally, transponder data streams 602' and 604' mirror the transponder data streams 602 and 604, with segments 610-1'-610-n' mirroring the segments 610-1-610-n. The mirroring of streams enhances the data distribution scheme by providing for fault tolerance. If one or both of the transponder data streams 502 and 504 are lost, the transponder data streams 602' and 604' provide redundancy of data to cover the loss.

Referring again to FIG. 4, in some embodiments, the data distribution controller 460 may include one or more redundancy information generators 466. The redundancy information generator 466 may be configured to provide redundancy information for multiple transponder data streams such that if one or more streams, or data therefrom, is lost, there is enough information in the rest of the streams so that the loss is recoverable. Based on the redundancy information provided by the redundancy information generator 466, the lost portion could be recreated so that the full data set is available. If data is split amongst five different streams, for example, data may be recoverable from a subset of those streams based on the redundancy information provided for the subset of those streams.

The redundancy information generator 466 may employ any suitable technique to generate redundancy information. For example without limitation, the redundancy information may be based on parity. In some embodiments, parity data may be generated for the stream data based on the Boolean XOR function in accordance with conventional techniques. Thus, for example, if data is split amongst five different streams and one stream is lost, data of the remaining streams may be combined with parity data to reconstruct the missing data using the Boolean XOR function. In some embodiments, parity information may be generated based on the segmentation of data provided with the segmentation controller 464. In some embodiments, parity information may be generated for every set of data that is segmented for distribution across X streams, considering X+1 total streams. For example, considering a total of five streams, parity information may be generated for every set of data that is segmented for distribution to four streams. In some embodiments, all parity information may be distributed in a single stream. In some embodiments, sequential parity information may be alternatingly interleaved among all the streams. In various embodiments, parity may be calculated for any suitable level of division, including bit-level, byte-level, packet-level, and/or the like.

Figure 7:
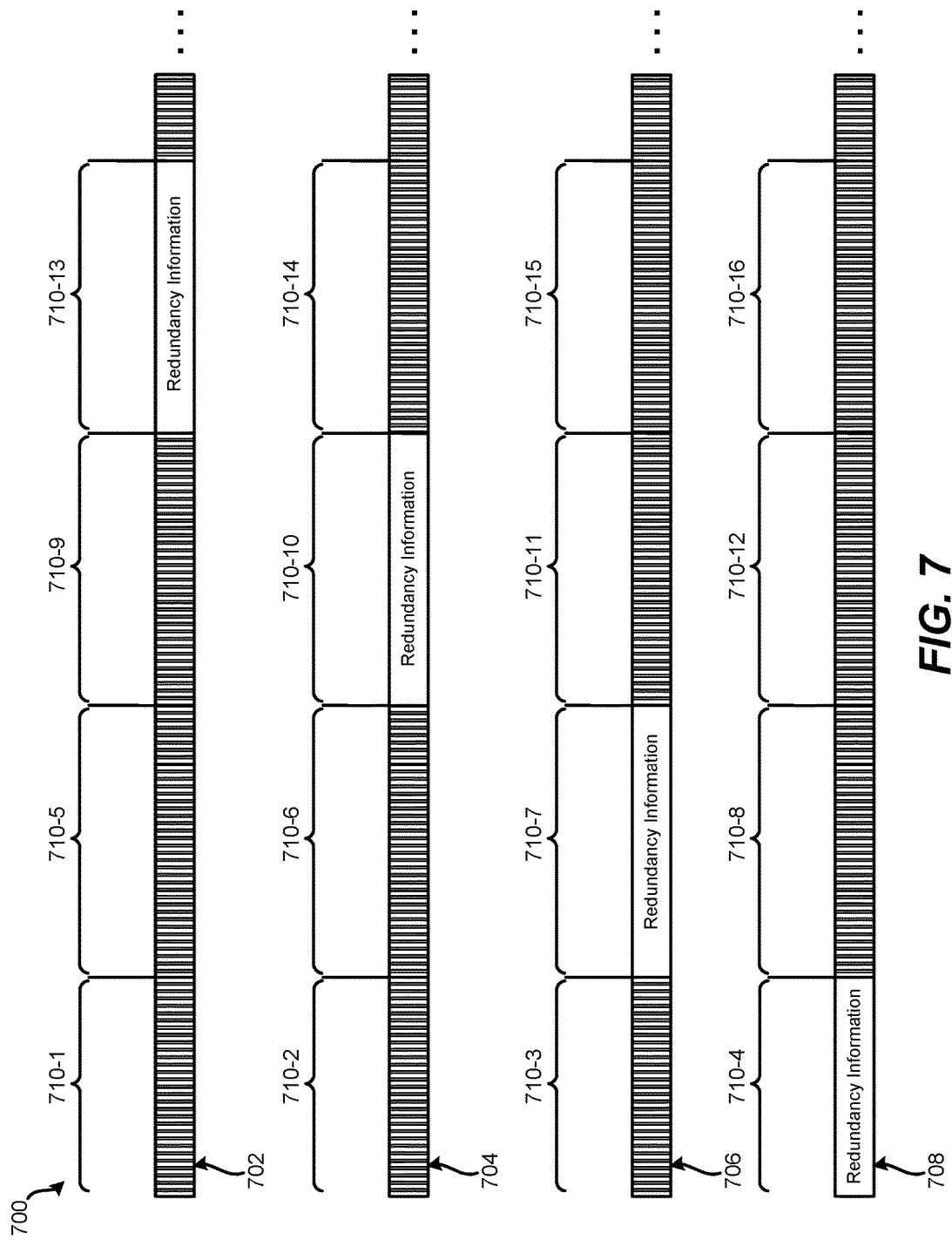
FIG. 7 illustrates a data transmission for one possible data distribution scheme where redundancy information may be alternatingly interleaved among segmented data to provide redundancy, in accordance with certain embodiments of the present disclosure.

FIG. 7 illustrates an embodiment of data transmission 700 for one possible data distribution scheme where redundancy information may be alternatingly interleaved among segmented data to provide redundancy, in accordance with certain embodiments of the present disclosure. In FIG. 7, transponder data streams 702, 704, 706, and 708 are illustrated. The first transponder data stream 702 may include video, audio, and/or other data corresponding to a first segment 710-1. The second transponder data stream 704 may include video, audio, and/or other data corresponding to a second segment 710-2, where the second segment 710-2 may sequentially and/or logically follow the first segment 710-1. Likewise, the third transponder data stream 706 may include video, audio, and/or other data corresponding to a third segment 710-3, where the third segment 710-3 may sequentially and/or logically follow the second segment 710-2. The fourth transponder data stream 708 may include redundancy information 710-4. The redundancy information 710-4 may be based on parity, in some embodiments. In some embodiments, the redundancy information 710-4 may be derived at least in part from the segments 710-1, -2, and/or -3. Thus, for example, the redundancy information 710-4 may be available for regeneration of certain of the segments 710-1, -2, and/or -3 in the event of a data loss for one of those segments.

The first transponder data stream 702 and second transponder data stream 704 may further include video, audio, and/or other data corresponding to next segments 710-5 and 710-6, where the segment 710-6 may sequentially and/or logically follow the segment 710-5. In some embodiments not depicted, all redundancy information may be distributed in a single stream. Thus, all redundancy information could be distributed in the transponder data stream 708, for example. In other embodiments not depicted, redundancy information may be distributed in a subset of transponder streams. However, in some embodiments as depicted, sequential redundancy information may be alternatingly interleaved among all the transponder data streams 702, 704, 706, and 708. Accordingly, the third transponder data stream 706 may further include redundancy information 710-7, and the fourth transponder data stream 708 may further include video, audio, and/or other data corresponding to next segment 710-8, where the segment 710-8 may sequentially and/or logically follow the segment 710-6. The redundancy information 710-7 may be based on parity, in some embodiments. In some embodiments, the redundancy information 710-7 may be derived at least in part from the segments 710-5, -6, and/or -8. Thus, for example, in various embodiments, the redundancy information 710-7 may be available for regeneration of certain of the segments 710-5, -6, and/or -8 in the event of a data loss for one of those segments. As depicted, interleaving may continue in the same manner for the transponder data streams 702, 704, 706, and 708 for similar segments 710-9 up to segment 710-n for any suitable extent. Accordingly, as data and redundancy information is split amongst the transponder data streams 702, 704, 706, and 708, in the event of a loss of certain of those streams, or data thereof, missing data may be reconstructable from a subset of those streams based on redundancy information provided with the subset of those streams.

Some embodiments may employ data distribution schemes where redundancy information provided with segmented data, and one or more of the transponder streams is replicated to provide additional redundancy. The mirroring of streams enhances the data distribution schemes by providing for additional fault tolerance. In some embodiments, redundancy information may be interleaved with segmented data, and one or more of the transponder streams may be replicated. In some embodiments, redundancy information may be placed in one or more streams dedicated to conveying redundancy information, and one or more of the transponder streams may be replicated. For example, only the one or more streams dedicated to conveying redundancy information may be replicated, in some embodiments.

Figure 8:
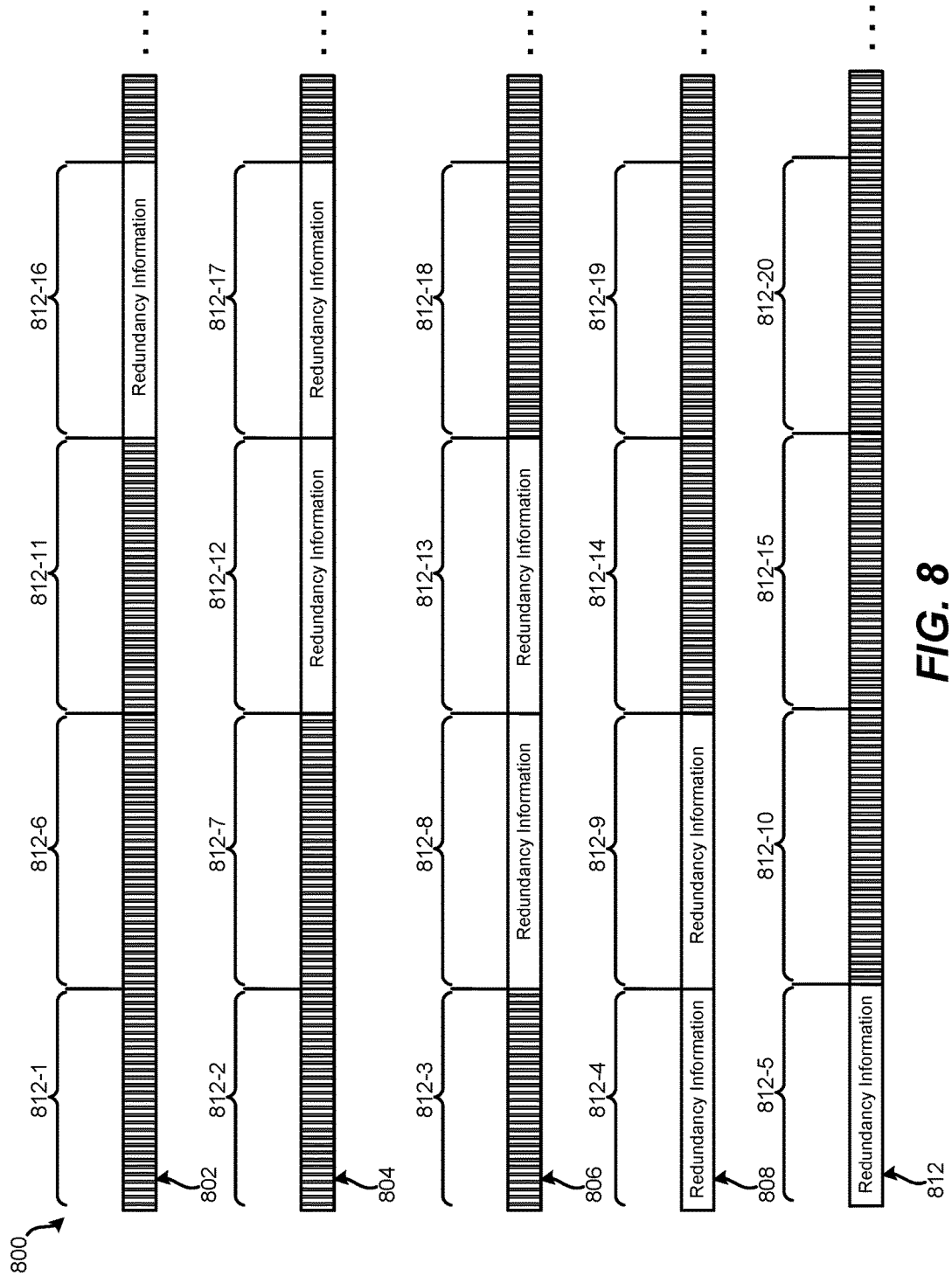
FIG. 8 illustrates a data transmission for one possible data distribution scheme where double redundancy information may be alternatingly interleaved among segmented data to provide redundancy.

In some embodiments, double redundancy information may be generated and provided with transponder streams to provide for additional fault tolerance. Providing double redundancy information may allow for the possibility of recovering from a loss of multiple streams or data thereof. FIG. 8 illustrates an embodiment of data transmission 800 for one possible data distribution scheme where double redundancy information may be alternatingly interleaved among segmented data to provide redundancy, in accordance with certain embodiments of the present disclosure. In FIG. 8, transponder data streams 802, 804, 806, 808, and 810 are illustrated. The transponder data streams 802, 804, 806, 808, and 810 may generally correspond to the transponder data streams of the data transmission 700, but further include an additional transponder data stream, as illustrated by the transponder data stream 810, and double redundancy information, as illustrated by segments 812-4, -5, -8, -9, etc. Accordingly, the data transmission 800 may allow for the possibility of recovering from a loss of multiple transponder data streams 802, 804, 806, 808, and/or 810 or data thereof. For example, in various embodiments, the redundancy information 812-4 and 812-5 may be derived at least in part from the segments 812-1, -2, and/or -3. In some embodiments, the redundancy information 812-4 and 812-5 may each be duplicative of the other. Thus, for example, the redundancy information 812-4 and 812-5 may be available for regeneration of certain of the segments 813-1, -2, and/or -3 in the event of a data loss for one or two of those segments. As depicted, interleaving may continue in the same manner for the transponder data streams 802, 804, 806, 808, and 810 for similar segments up to segment 812-$n$ for any suitable extent. Accordingly, as data and redundancy information is split amongst the transponder data streams 802, 804, 806, 808, and 810, in the event of a loss of certain of those streams, or data thereof, missing data may be reconstructable from a subset of those streams based on redundancy information provided with the subset of those streams.

Accordingly, with the various data distribution schemes disclosed herein, two or more transponder data streams may be transmitted by one or more transmitters 470 to one or more satellites, such as satellite(s) 130, for relay to subscribers' set-top boxes, such as STB 150. In various embodiments, data may be separated, replicated, and/or distributed across two or more of the satellites and/or transponders. While the preparation of the two or more transponder data streams according to various data distribution schemes may be performed at the television service provider system 110, the preparation may be performed by other similar systems or by the satellite(s) 130 implementing the functions of the data distribution controller 460, in various alternative embodiments.

Figure 9:
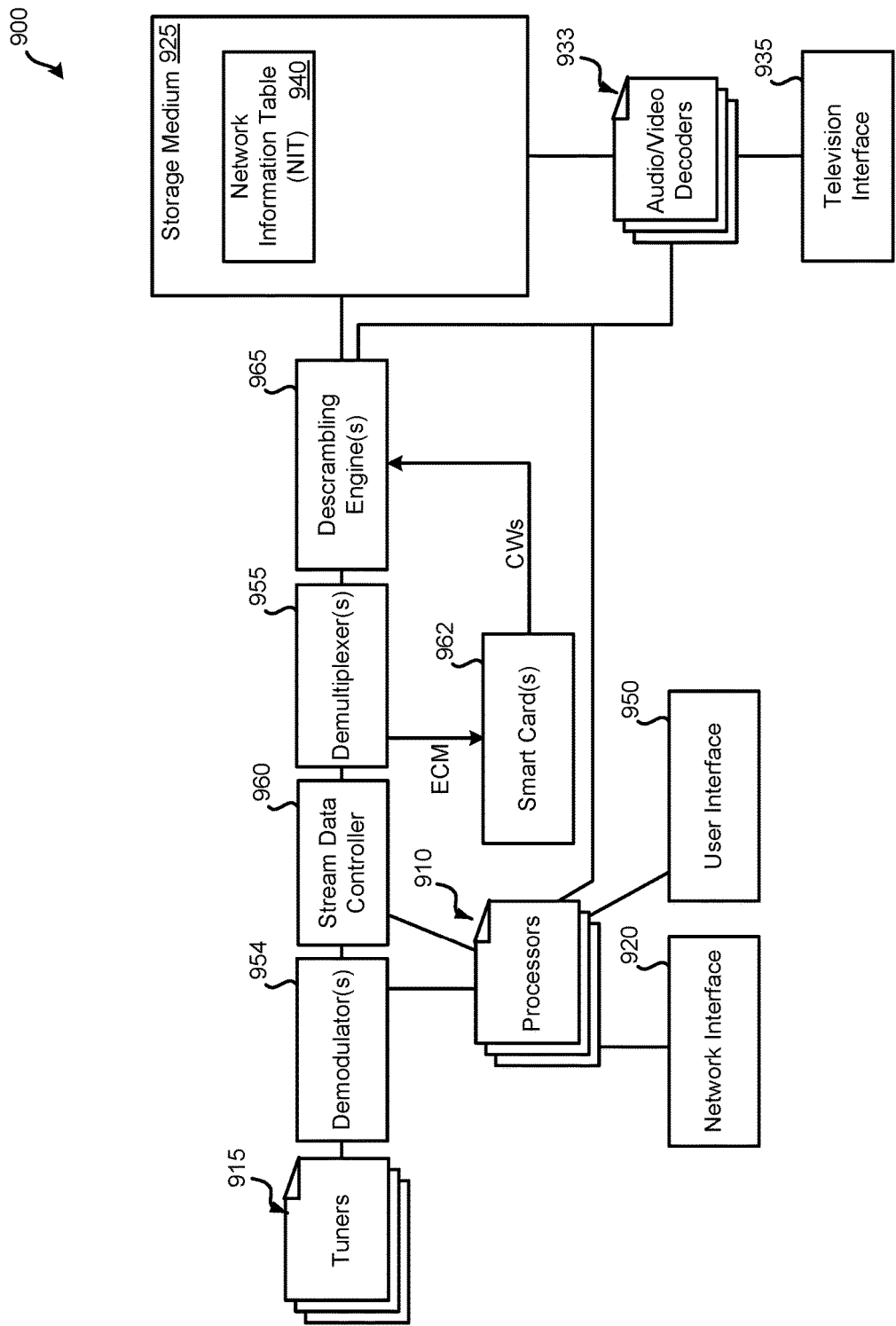
FIG. 9 illustrates a simplified diagram of a set-top box, in accordance with certain embodiments of the present disclosure.

FIG. 9 illustrates a block diagram of an embodiment of a set-top box 900 configured for facilitating one or more satellite data distribution schemes, in accordance with certain embodiments of the present disclosure. STB 900 may be set-top box 150 of FIG. 1, or may be incorporated as part of a television, such as television 160 of FIG. 1. STB 900 may include: processors 910, tuners 915, stream data controller 960, network interface 920, non-transitory computer-readable storage medium 925, television interface 935, networking information table (NIT) 940, user interface 950, demultiplexer(s) 955, smart card(s) 962, and/or descrambling engine(s) 965. In other embodiments of STB 900, smaller or greater numbers of components may be present. Various embodiments of STB 900 may include any suitable number of tuners 915 and attendant components to facilitate various features disclosed herein. For example, various embodiments may include up to eight or more—any suitable number—of tuners 915 to facilitate embodiments of the present disclosure. It should be understood that the various components of STB 900 may be implemented using hardware, firmware, software, and/or some combination thereof.

Processors 910 may include one or more general-purpose processors configured to perform processes such as tuning to a particular channel, displaying the EPG, and/or receiving and processing input from a user. Processors 910 may include one or more special purpose processors. For example, processors 910 may include one or more processors dedicated to decoding video signals from a particular format, such as MPEG, for output and display on a television and for performing decryption. It should be understood that the functions performed by various modules of FIG. 9 may be performed using one or more processors. As such, for example, functions of descrambling engine 965 or stream data controller 960 may be performed by processor 910.

Tuners 915 may be used to tune to television channels, such as television channels transmitted via satellite or cable. Each tuner contained in tuners 915 may be capable of receiving and processing a single stream of data from a satellite transponder (or a cable RF channel) at a given time. As such, a single tuner may tune to a single transponder (or cable RF channel). In certain embodiments, one tuner may be used to tune to a television channel on a first transponder of a first satellite for display using a television, while another tuner may be used to tune to a television channel on a second transponder of the first satellite or a different satellite for recording and viewing at some other time. If multiple television channels transmitted on the same transponder stream are desired, a single tuner of tuners 915 may be used to receive the signal containing the multiple television channels for presentation and/or recording.

Transponder signals selected by tuners 915 may be demodulated by one or more demodulators 954. The number of demodulators 954 may correspond to the number of tuners 915 in certain embodiments. Signals associated with the various stages preceding the one or more demodulators 954 may include a combination of an information-carrying signal and a sinusoidal carrier signal. Prior to transmission from the uplink station 110, the information-carrying signal may modulate a sinusoidal carrier signal to form the uplink signal that is transmitted to the satellite 130. The signal received by the demodulators 954 may represent a frequency translated version of the original uplink signal. One or more demodulators 954 may perform an operation that is substantially an inverse of the modulation operation that occurred at the uplink station 110. The demodulator 954 may remove the sinusoidal carrier signal and may output the information carrying signal as a baseband signal. In addition, the demodulators 954 or other module may perform an error correction and packet synchronization functions. Output from the demodulators 954 may be directed to demultiplexer (s) 955, the processors 915, and/or any other suitable component. In certain embodiments, the STB 900 may be configured to tune and demodulate data from multiple transponders simultaneously. For example without limitation, the STB 900 may be configured to tune and demodulate data from up to eight or more transponders simultaneously.

The stream data controller 960 may be configured for facilitating one or more satellite data distribution schemes, in accordance with certain embodiments of the present disclosure. The stream data controller 960 may be configured to manage data that has been separated, replicated, and/or distributed in two or more received data streams. The functions of the stream data controller 960 may be implemented in software and/or hardware in various embodiments. In various embodiments, the set-top box 900 and/or the stream data controller 960 may include any device or set of devices configured to compute, process, organize, categorize, qualify, send, receive, retrieve, generate, convey, store, display, present, detect, handle, and/or use any form of information and/or data suitable for embodiments described herein. The stream data controller 960 may receive digital streams containing the video, audio, and other data corresponding to the transponder data streams. In some embodiments, the stream data controller 960 may access data and stage the data for further processing by other components of the set-top box 900. In some embodiments, the stream data controller 960 may buffer staged data in the storage medium 925. In some embodiments, the stream data controller 960 may convey data to the demultiplexer(s) 955.

In some embodiments, the stream data controller 960 may be configured to detect if a data loss has occurred. In some embodiments, the stream data controller 960 may confirm whether an expected transponder data stream, an expected television channel, and/or expected data has been successfully received by the set-top box 900. In the event of an unsuccessful reception, the stream data controller 960 may identify the condition so that a message may be transmitted to the television service provider system 110, for example, via a processor 910 and the network interface 920.

In some embodiments, the stream data controller 960 may identify a specific data distribution scheme according to which transponder data streams have been sent and may process received data according to the identified data distribution scheme. In some embodiments, a data distribution scheme may be implemented as a default, and the stream data controller 960 may process received data according to the default scheme. In some embodiments, where the television service provider system 110 may indicate to the set-top box 900 a satellite 130, transponder, and/or data distribution scheme, the stream data controller 960 may be configured to process received at least partially based on the indication.

In some embodiments, the stream data controller 960 may determine whether a replicated transponder data stream and/or a replicated segment of a transponder data stream is needed. The stream data controller 960 may identify, select, discard, mark, buffer, convey, and/or otherwise process any received replicated data. In some embodiments, the stream data controller 960 may process data that has been segmented across different streams according to the sequential and/or logical order in which the data has been segmented. In some embodiments, the stream data controller 960 may check segmented data received via different transponder data streams for proper sequencing. In some embodiments, the stream data controller 960 may filter replicated data received via one or more separate data streams. If the replicated data is not needed, the stream data controller 960 may discard it. If the replicated data is needed, the stream data controller 960 may process the data to supply needed data.

In some embodiments, the stream data controller 960 may identify, select, discard, mark, buffer, convey, and/or otherwise process any received redundancy information. In some embodiments, the stream data controller 960 may use redundancy information to recover lost data. The stream data controller 960 may recreate the lost data based on the redundancy information so that a full data set is available. The stream data controller 960 may be configured to employ any suitable technique to use redundancy information. For example without limitation, where the redundancy information may be based on parity, the stream data controller 960 may combine the received data with parity data to reconstruct the missing data using the Boolean XOR function.

In some embodiments, as depicted, the stream data controller 960 may be employed subsequently to certain components, such as the demodulators 954; in alternative embodiments, the stream data controller 960 may be employed antecedently to certain components, such as the demodulators 954.

Network interface 920 may be used to communicate via an alternate communication channel with a television service provider. For example, the primary communication channel may be via satellite (which may be unidirectional to the STB) and the alternate communication channel (which may be bidirectional) may be via a network, such as the Internet. Referring back to FIG. 1, STB 150 may be able to communicate with television service provider system 110 via a network, such as the Internet. This communication may be bidirectional: data may be transmitted from STB 150 to television service provider system 110 and from television service provider system 110 to STB 150. Referring back to FIG. 9, network interface 920 may be configured to communicate via one or more networks, such as the Internet, to communicate with television service provider system 110 of FIG. 1. Information may be transmitted and/or received via network interface 920.

Storage medium 925 may represent one or more non-transitory computer readable storage media. Storage medium 925 may include memory and/or a hard drive. Storage medium 925 may be used to store information received from one or more satellites and/or information received via network interface 920. Storage medium 925 may store information related to an EPG, NIT 940, and/or a DVR.

One or more audio/video decoders 933 may serve to convert encoded video and audio into a format suitable for output to a display device. For instance, audio/video decoder 933 may receive MPEG video and audio from storage medium 925 or descrambling engine 965 to be output to a television. Audio/video decoder 933 may convert the MPEG video and audio into a format appropriate to be displayed by a television or other form of display device and audio into a format appropriate to be output from speakers, respectively. The number of audio/video decoders 933 may correspond to the number of tuners 915 in certain embodiments.

Television interface 935 may serve to output a signal to a television (or another form of display device) in a proper format for display of video and playback of audio. As such, television interface 935 may output one or more television channels, stored television programming from storage medium 925 (e.g., a DVR and/or information from an EPG)

to a television for presentation. User interface 950 may include a remote control (physically separate from STB 900) and/or one or more buttons on STB 900 that allows a user to interact with STB 900.

A network information table (NIT) 940, as previously discussed with respect to Table 1, may store information used by set-top box 900 to access various television channels. NIT 940 may be stored using storage medium 925. Information used to populate NIT 940 may be received via satellite (or cable) through tuners 915 and/or may be received via network interface 920 from the television service provider. As such, information present in NIT 940 may be periodically updated. NIT 940 may be locally-stored by STB 900 using storage medium 925. NIT 940 may be periodically updated by a television service provider. As such, television channels may be reassigned to different satellites and/or transponders, and STB 900 may be able to handle this reassignment as long as NIT 940 is updated. Whether a user directly tunes to a television channel or a DVR tunes to a first television channel, NIT 940 may be used to determine the satellite, transponder, ECM PID (packet identifier), audio PID, and video PID.

Referring back to tuners 915, television channels received via satellite (or cable) may contain at least some scrambled data. Packets of audio and video may be scrambled to prevent unauthorized users (e.g., nonsubscribers) from receiving television programming without paying the television service provider. When a tuner of tuners 915 is receiving data from a particular transponder of a satellite, the transponder stream may be a series of data packets corresponding to multiple television channels. Each data packet may contain a packet identifier (PID), which in combination with NIT 940, can be determined to be associated with particular television channel. Particular data packets, referred to as entitlement control messages (ECMs), may be periodically transmitted. ECMs may be encrypted; STB 900 may use smart card 962 to decrypt ECMs. Decryption of an ECM may only be possible if the user has authorization to access the particular television channel associated with the ECM. When an ECM is received by demultiplexer 955 and the ECM is determined to correspond to a television channel being stored and/or displayed, the ECM may be provided to smart card 962 for decryption.

When smart card 962 receives an encrypted ECM from demultiplexer 955, smart card 962 may decrypt the ECM to obtain some number of control words. In some embodiments, from each ECM received by smart card 962, two control words are obtained. In some embodiments, when smart card 962 receives an ECM, it compares the ECM to the previously received ECM. If the two ECMs match, the second ECM is not decrypted because the same control words would be obtained. In other embodiments, each ECM received by smart card 962 is decrypted; however, if a second ECM matches a first ECM, the outputted control words will match; thus, effectively, the second ECM does not affect the control words output by smart card 962. When an ECM is received by smart card 962, it may take a period of time for the ECM to be decrypted to obtain the control words. As such, a period of time, such as 9 seconds, may elapse before the control words indicated by the ECM can be obtained. Smart card 962 may be permanently part of STB 900 or maybe configured to be inserted and removed from STB 900.

Demultiplexer(s) 955 may be configured to filter data packets based on PIDs. For example, if a transponder data stream includes multiple television channels, data packets corresponding to a television channel that is not desired to be stored or displayed by the user, may be discarded by demultiplexer 955. As such, only data packets corresponding to the one or more television channels desired to be stored and/or displayed may be passed to either descrambling engine 965 or smart card 962; other data packets may be discarded. For each channel, a stream of video packets, a stream of audio packets and/or a stream of ECM packets may be present, each stream identified by a PID. In some embodiments, a common ECM stream may be used for multiple television channels. Additional data packets corresponding to other information, such as updates to NIT 940, may be appropriately routed by demultiplexer 955.

Descrambling engine(s) 965 may use the control words output by smart card 962 in order to descramble video and/or audio corresponding to television channels for storage and/or presentation. Video and/or audio data contained in the transponder data stream received by tuners 915 may be scrambled. The video and/or audio may be descrambled by descrambling engine 965 using a particular control word. Which control word output by smart card 962 to be used for successful descrambling may be indicated by a scramble control identifier present within the data packet containing the scrambled video or audio. Descrambled video and/or audio may be output by descrambling engine 965 to storage medium 925 for storage (via a DVR) and/or to audio/video decoder 933 for output to a television or other presentation equipment via television interface 935.

For simplicity, STB 900 of FIG. 9 has been reduced to a block diagram, commonly known parts, such as a power supply, have been omitted. Further, some routing between the various modules of STB 900 has been illustrated. Such illustrations are for exemplary purposes only. Two modules not being directly or indirectly connected does not indicate the modules cannot communicate. Rather, connections between modules of the STB 900 are intended only to indicate possible common data routing. It should be understood that the modules of STB 900 may be combined into a smaller number of modules or divided into a greater number of modules. Further, the components of STB 900 may be part of another device, such as built into a television. Also, while STB 900 may be used to receive, store, and present television channels received via a satellite, it should be understood that similar components may be used to receive, store, and present television channels via a cable network.

Figure 10:
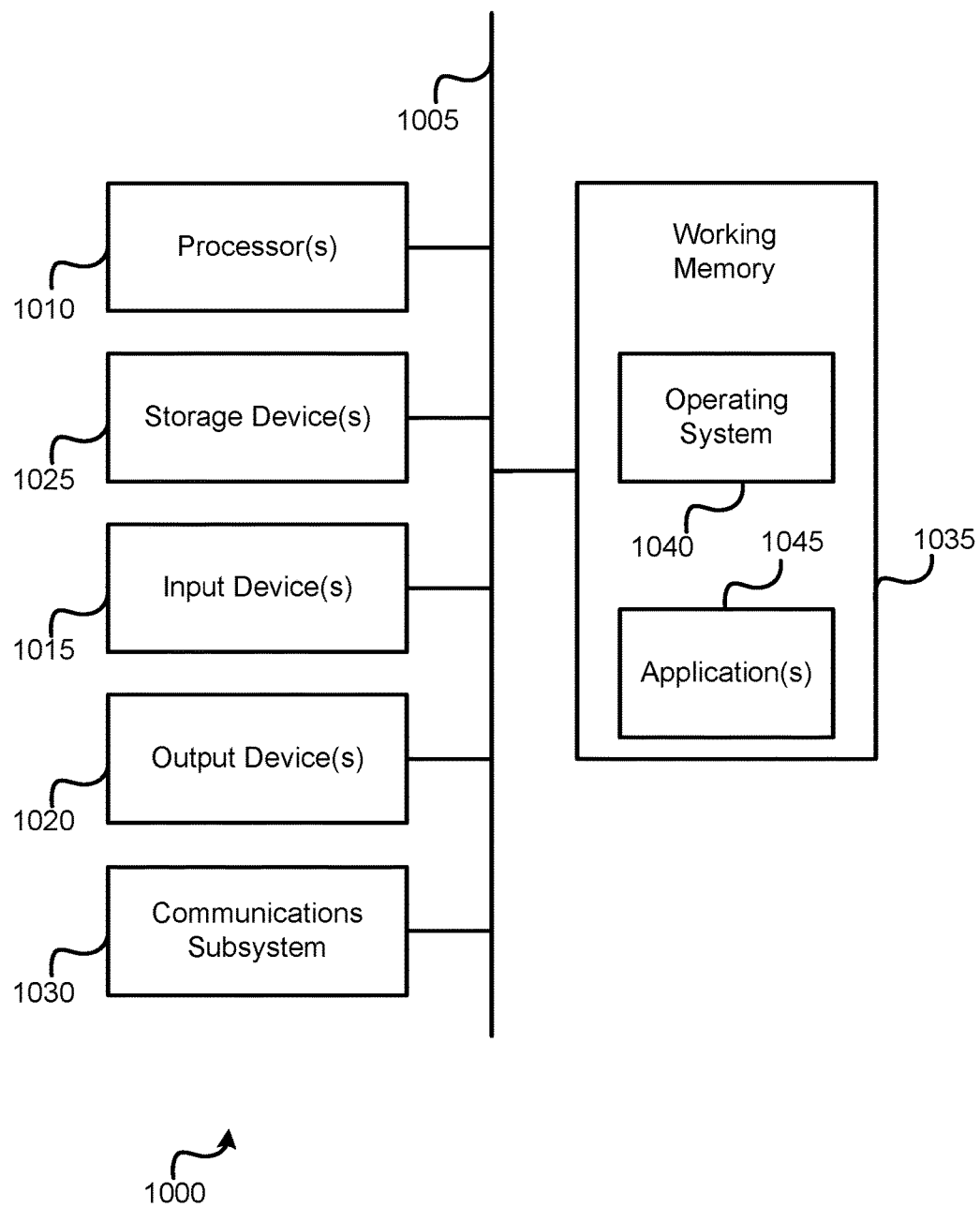
FIG. 10 illustrates a diagram of a computer system, in accordance with certain embodiments of the present disclosure.

A computer system as illustrated in FIG. 10 may be incorporated as part of the previously described devices, such as the content receiver (e.g, set top box). FIG. 10 provides a schematic illustration of one embodiment of a computer system 1000 that can perform the methods provided by various embodiments. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005 (or may otherwise be in communication, as appropriate). The hardware elements may include one or more processors 1010, including without limitation one or more general-purpose processors and/or one or more special-purpose processors (such as digital signal processing chips, graphics acceleration processors, and/or the like); one or more input devices 1015, which can include without limitation a mouse, a keyboard, and/or the like; and one or more output devices 1020, which can include without limitation a display device, a printer, and/or the like.

The computer system 1000 may further include (and/or be in communication with) one or more non-transitory storage devices 1025, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 1000 might also include a communications subsystem 1030, which can include without limitation a modem, a network card (wireless or wired), an infrared communication device, a wireless communication device, and/or a chipset (such as a Bluetooth™ device, an 1002.11 device, a WiFi device, a WiMax device, cellular communication facilities, etc.), and/or the like. The communications subsystem 1030 may permit data to be exchanged with a network (such as the network described below, to name one example), other computer systems, and/or any other devices described herein. In many embodiments, the computer system 1000 will further comprise a working memory 1035, which can include a RAM or ROM device, as described above.

The computer system 1000 also can comprise software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 1025 described above. In some cases, the storage medium might be incorporated within a computer system, such as computer system 1000. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1000) to perform methods in accordance with various embodiments of the invention. According to a set of embodiments, some or all of the procedures of such methods are performed by the computer system 1000 in response to processor 1010 executing one or more sequences of one or more instructions (which might be incorporated into the operating system 1040 and/or other code, such as an application program 1045) contained in the working memory 1035. Such instructions may be read into the working memory 1035 from another computer-readable medium, such as one or more of the non-transitory storage device(s) 1025. Merely by way of example, execution of the sequences of instructions contained in the working memory 1035 might cause the processor(s) 1010 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1000, various computer-readable media might be involved in providing instructions/code to processor(s) 1010 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 1025. Volatile media include, without limitation, dynamic memory, such as the working memory 1035.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000.

The communications subsystem 1030 (and/or components thereof) generally will receive signals, and the bus 1005 then might carry the signals (and/or the data, instructions, etc. carried by the signals) to the working memory 1035, from which the processor(s) 1010 retrieves and executes the instructions. The instructions received by the working memory 1035 may optionally be stored on a non-transitory storage device 1025 either before or after execution by the processor(s) 1010.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. In some alternative embodiments, the entirety of one or more programs of interest may be recorded, and highlights within each program may be marked so that the user may directly skip to one highlight at a time.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A media device configured for receiving data from one or more satellites, the media device comprising:
   one or more processors; and
   one or more storage devices coupled to the one or more processors and configured to store instructions to cause the one or more processors to:
      tune to a first data stream transmitted over a first satellite transponder;
      wherein the first data stream was derived from source data based at least in part on a data distribution scheme, wherein the data distribution scheme comprises distributing at least portions of the source data using the first data stream;
      process at least a first portion of the first data stream to store and/or output content for presentation; and
      avoid or recover from a loss of at least a second portion of the first data stream at least in part by:
         identifying a second data stream based at least in part on a network information table that is stored in at least one of the one or more storage devices and that comprises satellite assignment information to a plurality of orbitally positioned satellites, where the second data stream is only partially replicative of the first data stream in accordance with a second data distribution scheme such that the second data stream comprises a third portion that is replicative of the second portion without comprising another portion that is replicative of the first portion of the first data stream; and
         tuning to the second data stream, the second data stream transmitted from one satellite of the plurality of orbitally positioned satellites.

2. The media device configured for receiving data from one or more satellites of claim 1, wherein the satellite assignment information indicates television channel assignments to satellites and/or transponders, and the one or more processors uses the network information table to avoid or recover from losses corresponding to television channels.

3. The media device configured for receiving data from one or more satellites of claim 2, the instructions to further cause the one or more processors to:
   process one or more communications received via a network from a remote system; and
   update the network information table based at least in part on the one or more communications.

4. The media device configured for receiving data from one or more satellites of claim 3, wherein the updating corresponds to one or more reassignments of the television channel assignments to one or more different satellites and/or different transponders.

5. The media device configured for receiving data from one or more satellites of claim 1, wherein the avoiding or recovering from the loss of the at least the second portion of the first data stream is further based at least in part on identifying the second data distribution scheme.

6. The media device configured for receiving data from one or more satellites of claim 1, wherein the media device:
   uses a first tuner to tune to the first data stream transmitted over the first satellite transponder; and
   uses a second tuner to tune to the second data stream transmitted over a second satellite transponder.

7. The media device configured for receiving data from one or more satellites of claim 6, wherein the media device:
   identifies the second tuner as being idle prior to using the second tuner to tune to the second data stream transmitted over the second satellite transponder.

8. A media device configured for receiving data from one or more satellites, the media device comprising:
   one or more processors; and
   one or more storage devices coupled to the one or more processors and configured to store instructions to cause the one or more processors to:
      tune, by a tuner of the media device, to a first data stream transmitted over a first satellite transponder;
      wherein the first data stream was derived from source data based at least in part on a data distribution scheme, wherein the data distribution scheme comprises distributing at least portions of the source data using the first data stream;
      process at least a first portion of the first data stream to store and/or output content for presentation; and
      avoid or recover from a loss of at least a second portion of the first data stream at least in part by:
         identifying a second data stream based at least in part on a network information table that is stored in at least one of the one or more storage devices and that comprises satellite assignment information to a plurality of orbitally positioned satellites, where the second data stream is only partially replicative of the first data stream in accordance with a second data distribution scheme such that the second data stream comprises a third portion that is replicative of the second portion without comprising another portion that is replicative of the first portion of the first data stream; and tuning, by the tuner of the media device, to the second data stream transmitted from one satellite of the plurality of orbitally positioned satellites based at least in part on one or more communications via a network to and/or from a remote system; and processing at least a second data segment of the second data stream, the second portion of the first data stream comprising a first data segment.

9. The media device configured for receiving data from one or more satellites of claim 8, wherein the second data segment of the second data stream is replicative of the first data segment of the first data stream.

10. The media device configured for receiving data from one or more satellites of claim 8, wherein the network information table comprises transponder assignment information.

11. The media device configured for receiving data from one or more satellites of claim 10, wherein the updating corresponds to one or more reassignments of television channel assignments to one or more different satellites and/or different transponders.

12. The media device configured for receiving data from one or more satellites of claim 8, wherein the avoiding or recovering from the loss of the at least the second portion of the first data stream is further based at least in part on identifying the second data distribution scheme.

13. One or more non-transitory, processor-readable media storing instructions that, when executed by one or more processors of a media device, cause the one or more processors to:

cause the media device to tune to a first data stream transmitted over a first satellite transponder;

wherein the first data stream was derived from source data based at least in part on a data distribution scheme, wherein the data distribution scheme comprises distributing at least portions of the source data using the first data stream;

process at least a first portion of the first data stream to store and/or output content for presentation; and cause the media device to avoid or recover from a loss of at least a second portion of the first data stream at least in part by:

identifying a second data stream based at least in part on a network information table that is stored in at least one storage device and that comprises satellite assignment information to a plurality of orbitally positioned satellites, where the second data stream is only partially replicative of the first data stream in accordance with a second data distribution scheme such that the second data stream comprises a third portion that is replicative of the second portion without comprising another portion that is replicative of the first portion of the first data stream; and tuning to the second data stream, the second data stream transmitted from one satellite of the plurality of orbitally positioned satellites.

14. The one or more non-transitory, processor-readable media of claim 13, wherein the satellite assignment information indicates television channel assignments to satellites and/or transponders, and the one or more processors uses the network information table to avoid or recover from losses corresponding to television channels.

15. The one or more non-transitory, processor-readable media of claim 14, the instructions to further cause the one or more processors to:

process one or more communications received via a network from a remote system; and update the network information table based at least in part on the one or more communications.

16. The one or more non-transitory, processor-readable media of claim 15, wherein the updating corresponds to one or more reassignments of the television channel assignments to one or more different satellites and/or different transponders.

17. The one or more non-transitory, processor-readable media of claim 13, wherein the avoiding or recovering from the loss of the at least the second portion of the first data stream is further based at least in part on identifying the second data distribution scheme.

18. The one or more non-transitory, processor-readable of claim 13, the instructions to further cause the one or more processors to:

identify a tuner as being idle and cause the media device to use the tuner to tune to the second data stream transmitted over a second satellite transponder.

* * * * *